(12) United States Patent
Kim

(10) Patent No.: US 8,970,684 B2
(45) Date of Patent: Mar. 3, 2015

(54) IMAGE DISPLAY APPARATUS AND METHOD FOR OPERATING THE SAME

(75) Inventor: Kangsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 452 days.

(21) Appl. No.: 13/276,969

(22) Filed: Oct. 19, 2011

(65) Prior Publication Data

US 2012/0105606 A1    May 3, 2012

(30) Foreign Application Priority Data

Oct. 28, 2010    (KR) ........................ 10-2010-0106184

(51) Int. Cl.
*H04N 13/04* (2006.01)
*G09G 3/34* (2006.01)
*G09G 3/36* (2006.01)

(52) U.S. Cl.
CPC ........... *H04N 13/0438* (2013.01); *G09G 3/342* (2013.01); *H04N 13/0497* (2013.01); *G09G 3/3648* (2013.01); *G09G 2310/024* (2013.01); *G09G 2310/061* (2013.01); *G09G 2320/0209* (2013.01); *G09G 2320/041* (2013.01); *G09G 2340/0435* (2013.01)
USPC .......................................................... 348/56

(58) Field of Classification Search
USPC .................................................... 348/42, 56
See application file for complete search history.

(56) References Cited

U.S. PATENT DOCUMENTS

| 6,388,388 | B1* | 5/2002 | Weindorf et al. .......... 315/169.3 |
| 2002/0149576 | A1 | 10/2002 | Tanaka et al. ................. 345/204 |
| 2004/0207609 | A1 | 10/2004 | Hata et al. ..................... 345/204 |
| 2008/0150879 | A1* | 6/2008 | Kang ............................ 345/102 |
| 2008/0180414 | A1 | 7/2008 | Fung et al. .................... 345/204 |
| 2009/0073343 | A1 | 3/2009 | Kojima et al. .................. 349/61 |
| 2010/0066820 | A1 | 3/2010 | Park et al. ....................... 348/53 |
| 2010/0238274 | A1 | 9/2010 | Kim et al. ....................... 348/51 |
| 2011/0109733 | A1* | 5/2011 | Kim et al. ....................... 348/56 |
| 2012/0007969 | A1* | 1/2012 | Lin ................................ 348/56 |

FOREIGN PATENT DOCUMENTS

| CN | 101290412 A | 10/2008 |
| CN | 101650922 A | 2/2010 |
| CN | 101697595 A | 4/2010 |
| CN | 101835057 A | 9/2010 |

OTHER PUBLICATIONS

Chinese Office Action dated Dec. 25, 2013 issued in Application No. 201110332618.4.
Chinese Office Action issued in a related Application Serial No. 201110332618.4 dated Jun. 5, 2014.
European Search Report dated Dec. 10, 2013 issued in Application No. 11 00 8505.

* cited by examiner

*Primary Examiner* — Sath V Perungavoor
*Assistant Examiner* — Jeffery Williams
(74) *Attorney, Agent, or Firm* — Ked & Associates, LLP

(57) ABSTRACT

A controller for a display device includes a formatter and a processor. The formatter generates a predetermined arrangement of left and right image data included in a three-dimensional (3D) video signal. The processor controls operation of one or more backlight lamps of a display device based on the predetermined arrangement of left and right image data and a detected temperature.

19 Claims, 21 Drawing Sheets

FIG.5
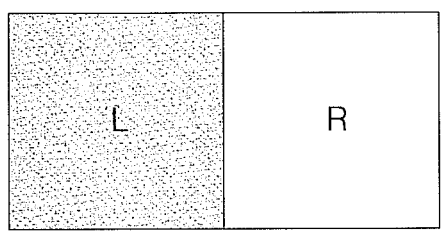
(a)
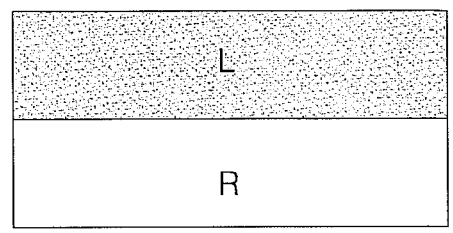
(b)
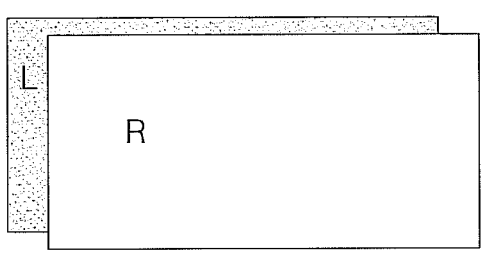
(c)
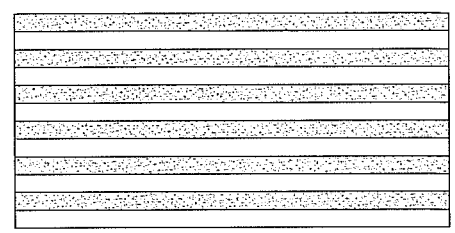
(d)
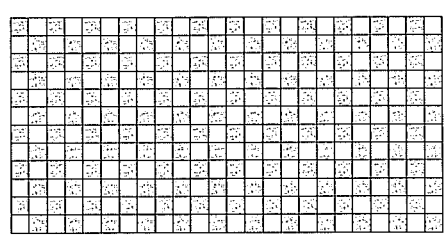
(e)

FIG.6
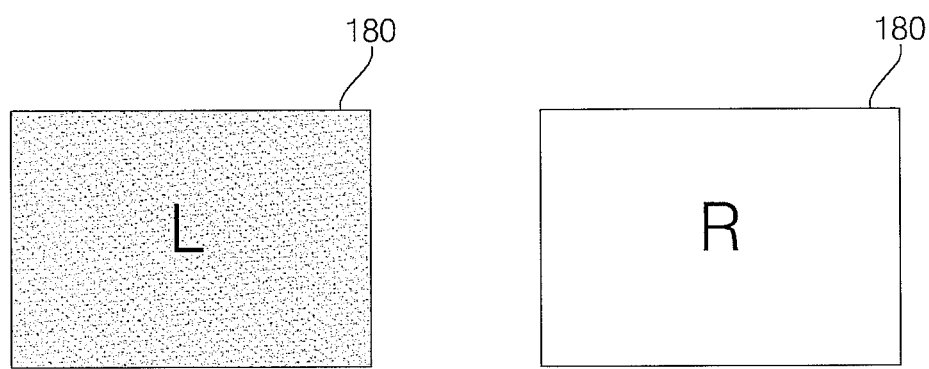
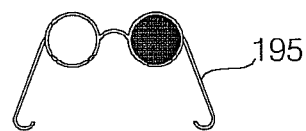
(a)
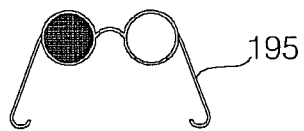
(b)

(a)            (b)

IMAGE DISPLAY APPARATUS AND METHOD FOR OPERATING THE SAME

CROSS-REFERENCE TO RELATED APPLICATION

This application claims the benefit of Korean Application No. 10-2010-0106184, filed on Oct. 28, 2010 in the Korean Intellectual Property Office, the contents of which is incorporated herein by reference.

BACKGROUND

1. Field

One or more embodiments disclosed herein relate to displaying images.

2. Background

An image display apparatus displays broadcast programs and other video signals in analog or digital form. Digital broadcasting offers many advantages over analog broadcasting such as robustness against noise, less data loss, ease of error correction, and the ability to provide high-definition, clear images. Recently, consumer interest has pushed the industry towards three-dimensional (3D) viewing.

BRIEF DESCRIPTION OF THE DRAWINGS

FIG. 5 shows various types of three-dimensional (3D) formats.

FIG. 6 shows how shutter glasses may operate in a frame sequential format.

DETAILED DESCRIPTION

Figure 1:
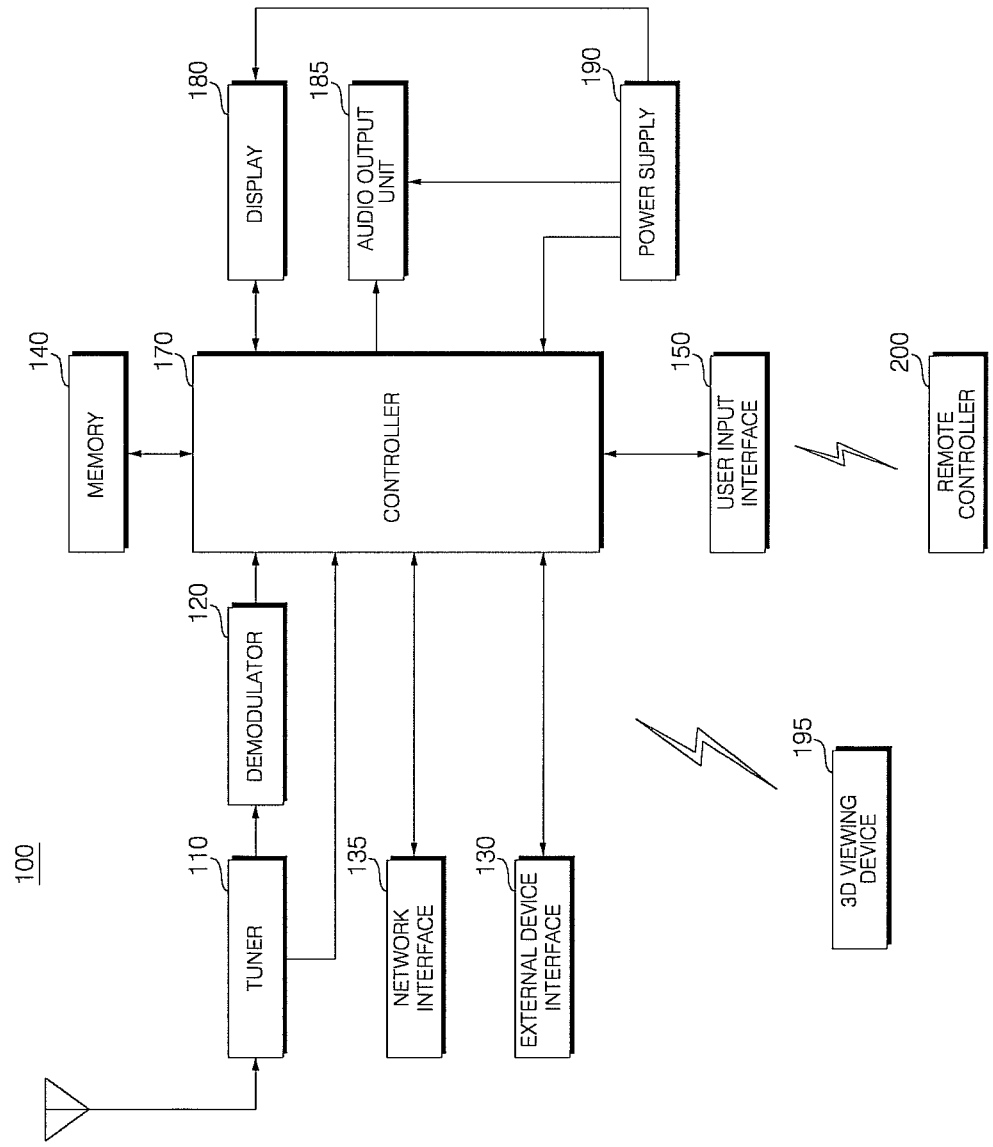
FIG. 1 shows one embodiment of an image display apparatus.

FIG. 1 is a block diagram of one embodiment of an image display apparatus 100 which includes a tuner 110, a demodulator 120, an external device interface 130, a memory 140, a network interface 150, a controller 170, a display 180, an audio output unit 185, a power supply 190, and a three-dimensional (3D) viewing device 195.

The tuner 110 selects a Radio Frequency (RF) broadcast signal corresponding to a channel selected by a user or a number of RF broadcast signals corresponding to all broadcast channels previously added to the image display apparatus 100 by a channel add function from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF. That is, the first tuner 120 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

In addition, the tuner 110 may sequentially select a number of RF broadcast signals corresponding to all broadcast channels previously added to the image display apparatus 100 by the channel add function from among a plurality of RF signals received through the antenna, and may downconvert the selected RF broadcast signals into IF signals or baseband A/V signals. The demodulator 120 receives the digital IF signal DIF from the tuner 110 and demodulates the digital IF signal DIF.

For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF received from the tuner 110, thereby obtaining a stream signal TS. The stream signal TS may be a signal in which a video signal, an audio signal and a data signal are multiplexed. For example, the stream signal TS 1 may be an MPEG-2 TS signal obtained by multiplexing an MPEG-2 video signal and a Dolby AC-3 audio signal. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS is input to the controller 170. The controller 170 may demultiplex the stream signal TS into a number of signals, process the demultiplexed signals, and output the processed signals as video data to the display 180 and as audio data to the audio output unit 185.

The external device interface 130 may connect an external device to the image display apparatus 100. For the purpose, the external device interface 130 may include an A/V Input/Output (I/O) unit (not shown) and a wireless communication module (not shown).

The external device interface 130 is connected wirelessly or by cable to an external device such as a Digital Versatile Disc (DVD) player, a Bluray player, a game console, a camera, a camcorder, or a computer (e.g., a laptop computer). Then, the external device interface 130 externally receives video, audio, and/or data signals from the external device and transmits the received external input signals to the controller 170. In addition, the external device interface 130 may output video, audio, and data signals processed by the controller 170 to the external device.

In order to receive or transmit A/V signals from or to the external device, the A/V I/O unit of the external device interface 130 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 130 may conduct short-range communication with other electronic devices. For the short-range communication, the wireless communication module may be connected to other electronic devices over a network according to communication standards such as Bluetooth, Radio Frequency Identificaiton (RFID), Infrared Data Association (IrDA), Ultra WideBand (UWB), and Zigbee.

In addition, the wireless communication module may perform short-range wireless communication with other electronic devices. For the short-range wireless communication, the wireless communication module may use Bluetooth, Radio-Frequency IDentification (RFID), Infrared Data Association (IrDA), Ultra WideBand (UWB), and ZigBee.

The external device interface 130 may be connected to various set-top boxes through at least one of the afore-mentioned ports and may thus receive data from or transmit data to the various set-top boxes. The external device interface 130 may transmit data to or receive data from the 3D viewing device 195.

The network interface 135 interfaces between the image display apparatus 100 and a wired/wireless network such as the Internet. The network interface 135 may include an Ethernet port for connection to a wired network. For connection to wireless networks, the network interface 135 may operate in conformance with communication standards such as Wireless Local Area Network (WAN) (i.e. Wi-Fi), Wireless Broadband (WiBro), World Interoperability for Microwave Access (WiMax), and High Speed Downlink Packet Access (HSDPA).

The network interface 135 may receive content or data from the Internet, a content provider, or a network provider over a network. The received content or data may include content such as movies, advertisements, games, Video-on-Demand (VoD) files, and broadcast signals, and information related to the content. The network interface 135 may also receive update information and update files of firmware from a network operator. The network interface 135 may transmit data to the Internet, the content provider, or the network provider.

The network interface 135 may be connected to, for example, an Internet Protocol (IP) TV. To enable interactive communication, the network interface 135 may provide video, audio and/or data signals received from an IPTV set-top box to the controller 170 and provide signals processed by the controller 170 to the IPTV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (HTTH-TV), TV over DSL, Video over DSL, TV over IP (TVIP), Broadband TV (BTV), Internet TV and full-browsing TV, which are capable of providing Internet access services.

The memory 140 may store various programs necessary for the controller 170 to process and control signals, and may also store processed video, audio and data signals. Also, the memory 140 may temporarily store a video, audio or data signal received from the external device interface 130. The memory 140 may store information about broadcast channels identified through the channel add function, such as a channel map.

The memory 140 may include, for example, at least one of a flash memory-type storage medium, a hard disk-type storage medium, a multimedia card micro-type storage medium, a card-type memory, a Random Access Memory (RAM), or a Read-Only Memory (ROM) such as an Electrically Erasable Programmable ROM (EEPROM). The image display apparatus 100 may open a file (such as a video file, a still image file, a music file, or a text file) stored in the memory 140 to the user.

While the memory 140 is shown in FIG. 1 as configured separately from the controller 170, memory 140 may be incorporated into the controller 170, for example.

The user input interface 150 transmits a signal received from the user to the controller 170 or transmits a signal received from the controller 170 to the user.

For example, the user input interface 150 may receive various user input signals such as may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a user input signal received from a sensor unit (not shown) that senses a user's gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 130 and process the demultiplexed signals so that the processed signals can be output as audio and video data.

The video signal processed by the controller 170 may be displayed as an image on the display 180. The video signal processed by the controller 170 may also be transmitted to an external output device through the external device interface 130.

The audio signal processed by the controller 170 may be output as sound to the audio output unit 185. Also, the audio signal processed by the controller 170 may be transmitted to the external output device through the external device interface 130. While not shown in FIG. 1, the controller 170 may include a demultiplexer (DEMUX) and a video processor, which will be described later with reference to FIG. 4.

In addition, the controller 170 may provide overall control to the image display apparatus 100. For example, the controller 170 may control tuning of the tuner 110 to an RF broadcast corresponding to a user-selected channel or a pre-stored channel.

The controller 170 may control the image display apparatus 100 according to a user command received through the user input interface 150 or according to an internal program. For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 130 to the display 180 or to the audio output unit 185 according to an external device video play command received through the external device interface 150.

The controller 170 may control display of images on the display 180. For instance, the controller 170 may control the display 180 to display a broadcast image received from the tuner 110, an external image received through the external device interface 130, an image received through the network interface 130, or an image stored in the memory 140.

The image displayed on the display 180 may be a two-dimensional (2D) or 3D still image or moving picture.

The controller 170 controls a particular object in the image displayed on the display 180 to be rendered as a 3D object. For example, the particular object may be at least one of a linked Web page (e.g. from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by a camera unit (not shown). Specifically, the controller 170 may measure the distance (a z-axis coordinate) between the user and the image display apparatus 100. In addition, the controller 170 may calculate x-axis and y-axis coordinates corresponding to the position of the user on the display 180.

The image display apparatus 100 may further include a channel browsing processor (not shown) for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded or without encoding. Also, it is possible to encode the thumbnail images into a stream and output the stream to the controller 170.

The controller 170 may display a thumbnail list including a plurality of received thumbnail images on the display 180. The thumbnail list may be displayed on a part of the display 180 with an image displayed on the display 180, that is, as a compact view, or the thumbnail list may be displayed in full screen on the display 180.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 is preferably capable of displaying 3D images according to one embodiment.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc. As special 3D glasses, polarized glasses operate in a passive manner, whereas shutter glasses operate in an active manner. Also, HMD types may be categorized into passive ones and active ones.

According to one embodiment, the 3D viewing device 195 is used to allow the user to view 3D images. The 3D viewing device 195 corresponds to the above-described additional display. The following description will be made mainly in the context of the 3D viewing device 195 being shutter glasses.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as voice. The audio output unit 185 may be various types of speakers.

To sense a user's gesture, the image display apparatus 100 may further include the sensor unit (not shown) that has at least one of a touch sensor, a voice sensor, a position sensor, or a motion sensor, as stated before. A signal sensed by the sensor unit may be output to the controller 170 through the user input interface 150.

The controller 170 may sense a user's gesture from an image captured by the camera unit or a signal sensed by the sensor unit, or by combining the captured image and the sensed signal.

The power supply 190 supplies power to the whole image display apparatus 100, particularly to the controller 170 that may be configured into a System On Chip (SOC), the display 180 for displaying images, and the audio output unit 185 for outputting audio data.

The remote controller 200 transmits a user input to the user input interface 150. For the transmission of a user input, the remote controller 200 may operate based on various communication standards such as Bluetooth, RF, IR, UWB and ZigBee. In addition, the remote controller 200 may receive a video signal, audio signal and/or data signal from the user input interface 150 and output the received signal as an image or sound.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs. Alternatively, the image display apparatus 100 may be a mobile digital broadcast receiver capable of at least one of terrestrial DMB broadcast programs, satellite DMB broadcast programs, ATSC-M/H broadcast programs, DVB-H (COFDM) broadcast programs, and Media Forward Link Only (MediaFLO) broadcast programs, or a mobile digital broadcast receiver capable of receiving cable, satellite and/or IPTV broadcast programs.

The image display apparatus 100 as set forth herein may be any of a TV receiver, a mobile phone, a smart phone, a laptop computer, a digital broadcast terminal, a Personal Digital Assistant (PDA), a Portable Multimedia Player (PMP), etc.

The block diagram of the image display apparatus 100 illustrated in FIG. 1 is an exemplary embodiment. The image display apparatus 100 is shown in FIG. 1 as having a number of components in a given configuration. However, the image display apparatus 100 may include fewer components or more components than those shown in FIG. 1 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

The following description is given with the appreciation that the image display apparatus 100 is capable of displaying 3D images and is an LCD panel-based display with a backlight unit.

Figure 2:
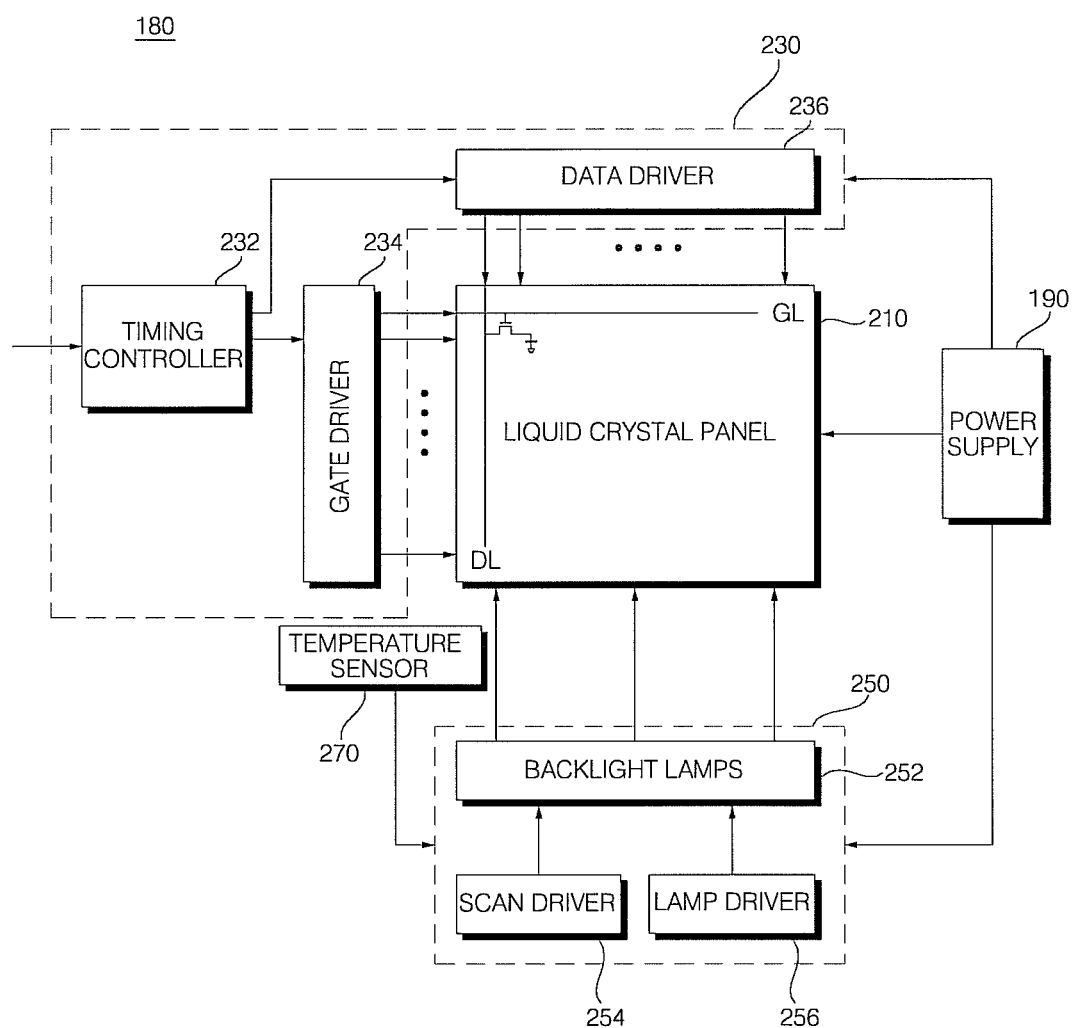
FIG. 2 shows a power supply and a display in the apparatus of FIG. 1.

FIG. 2 is a block diagram of the power supply and the display illustrated in FIG. 1. Referring to FIG. 2, the LCD panel-based display 180 includes a liquid crystal panel 210, a driving circuit 230, a backlight unit 250, and a temperature sensor 270.

The liquid crystal panel 210 has a first substrate, a second substrate, and a liquid crystal layer between the first and second substrates. On the first substrate, a plurality of gate lines GL and a plurality of data lines DL form a matrix, intersecting each other, and thin-film transistors and pixel electrodes connected to the thin-film transistors are provided at the intersections. Common electrodes are provided on the second substrate.

The driving circuit 230 drives the liquid crystal panel 210 according to control signals and data signals received from the controller 170 illustrated in FIG. 1. To drive the liquid crystal panel 210, the driving circuit 230 includes a timing controller 232, a gate driver 234, and a data driver 236.

The timing controller 232 receives a control signal, an RGB data signal, and a vertical synchronization signal V Sync from the controller 170, controls the gate driver 234 and the data driver 236 according to the control signal, re-arranges the RGB data signal, and provides the re-arranged RGB data signal to the data driver 236.

The gate driver 234 and the data driver 236 provide a scan signal and a video signal to the liquid crystal panel 210 through the gate lines GL and the data lines DL under the control of the timing controller 232.

The backlight unit 250 illuminates the liquid crystal panel 210. Thus the backlight unit 250 may include a plurality of backlight lamps 252 as light sources, a scan driver 254 for controlling the scanning driving of the backlight lamps 252, and a lamp driver 256 for turning on or off the backlight lamps 252.

When the backlight lamps 252 are turned on, light is projected onto the frontal surface of the liquid crystal panel 210 by means of a diffuser sheet (not shown) that diffuses incident light from the backlight lamps 252, a reflection sheet (not shown) that reflects the light, and an optical sheet (not shown) that polarizes, scatters, and diffuses the light.

The backlight lamps 252 may be arranged on the rear surface of the liquid crystal panel 210, especially on upper and lower sides of the rear surface of the liquid crystal panel 210. A display with this layout of backlight lamps is called an edge type. Compared to the edge type, the backlight lamps 252 may be arranged uniformly across the rear surface of the liquid crystal panel 210. A display with this backlight layout is called a direct type.

The backlight lamps 252 may be turned on simultaneously or sequentially on a block basis. The backlight lamps 252 may be Light Emitting Diodes (LEDs).

An image is displayed by light emitted from the backlight unit 250, with the light transmittance of the liquid crystal layer controlled using the electrical field between the pixel electrodes and the common electrodes of the liquid crystal panel 210.

The power supply 190 may supply a common electrode voltage Vcom to the liquid crystal panel 210 and a gamma voltage to the data driver 236. In addition, the power supply 190 supplies a driving voltage to the backlight unit 250 in order to drive the backlight lamps 252.

The temperature sensor 270 senses temperature inside or outside the image display apparatus 100, especially the ambient temperature of the liquid crystal panel 210. Because the response speed of liquid crystals in the liquid crystal panel 210 varies with temperature, temperature may be sensed for use in driving the backlight lamps 252. For this purpose, information indicating the sensed temperature may be provided the lamp driver 256 or the scan driver 254 of the backlight unit 250.

At least one of the turn-on timing or turn-on duty of the backlight lamps 252 may be adjusted according to the sensed temperature. Therefore, the backlight lamps 252 can be driven so as to reduce crosstalk according to a liquid crystal response curve that varies with temperature.

To sense the temperature of the liquid crystal panel 210, a thermistor whose resistance varies with temperature may be used. A Negative Temperature Coefficient (NTC) thermistor is one in which resistance decreases with an increase in temperature, whereas a Positive Temperature Coefficient (PTC) thermistor is one in which resistance increases with an increase in temperature.

For example, a variation in voltage with respect to a change in the temperature of the liquid crystal panel 210 may be sensed using a thermistor in a bias voltage generator (not shown) that generates a turn-on voltage Vgh for the gate end of gate driver 234.

Figure 3:
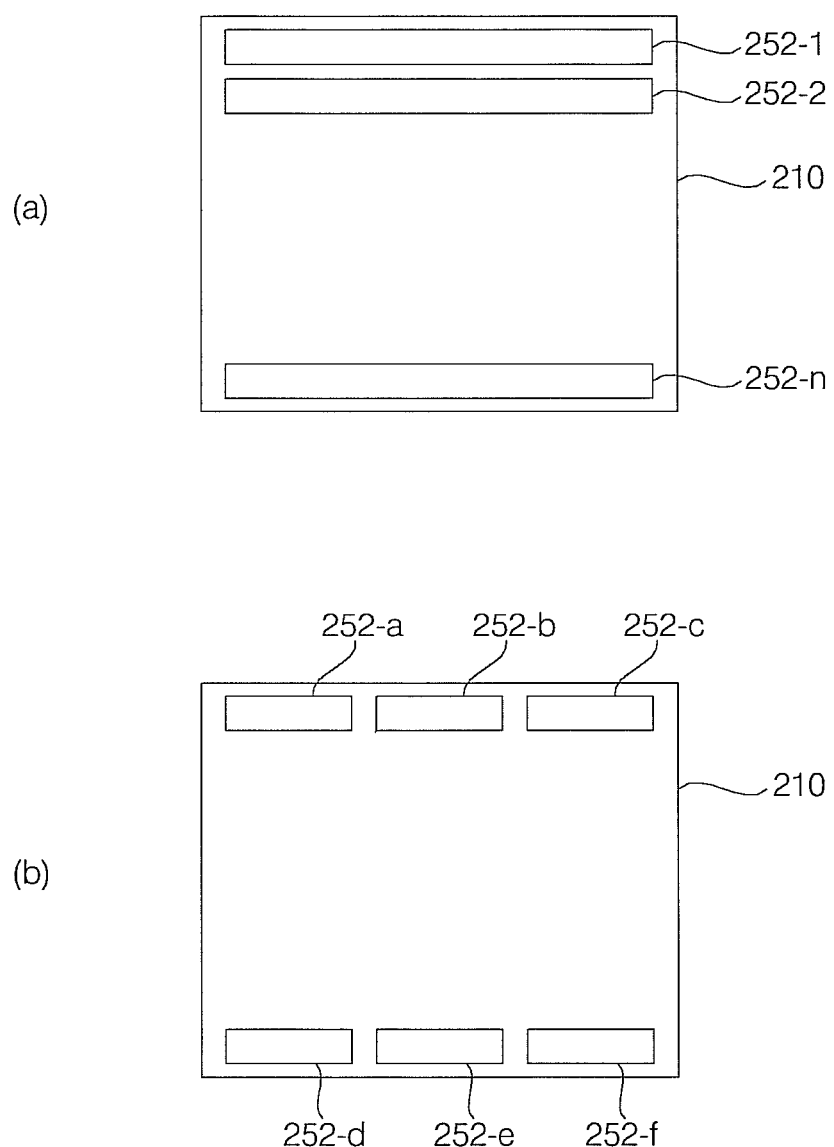
FIG. 3 shows examples of backlight lamp arrangements for FIG. 1.

FIG. 3 illustrates an exemplary layout of the backlight lamps illustrated in FIG. 2. Referring to FIG. 3(a), in image display apparatus 100 according to one embodiment, the display 180 may include the liquid crystal panel 210 and a plurality of backlight lamps 252-1 to 252-n. The backlight lamps 252-1 to 252-n may be LEDs.

The plurality of backlight lamps 252-1 to 252-n are arranged, particularly uniformly on the rear surface of the liquid crystal panel 210. When the backlight lamps 252-1 to 252-n are turned on, light is projected onto the frontal surface of the liquid crystal panel 210 by a diffuser sheet for diffusing incident light from the backlight lamps 252-1 to 252-n, a reflection sheet for reflecting the light, and an optical sheet for polarizing, scattering, and diffusing the light. A display with this layout of backlight lamps is called a direct type.

The plurality of backlight lamps 252-1 to 252-n may be turned on simultaneously or sequentially on a block-by-block basis. The following description is given, centering on the sequential turn-on of the backlight lamps 252-1 to 252-n on a block-by-block basis. While the backlight lamps 252-1 to 252-n are arranged in a row in FIG. 3(a), it may be further contemplated that the backlight lamps 252-1 to 252-n are grouped and the backlight lamps of each group are arranged in a row.

Referring to FIG. 3(b), a plurality of backlight lamps 252-a to 252-f may be arranged in a different layout from the layout illustrated in FIG. 3(a). The backlight lamps 252-a to 252-f may be arranged on one of the upper and lower sides of the rear surface of the liquid crystal panel 210. When the backlight lamps 252-*a* to 252-*f* are turned on, light is projected onto the frontal surface of the liquid crystal panel 210 by the diffuser sheet for diffusing incident light from the backlight lamps 252-*a* to 252-*f*, the reflection sheet for reflecting the light, and the optical sheet for polarizing, scattering, and diffusing the light. A display with this layout of backlight lamps is called an edge type.

The backlight lamps 252-*a*, 252-*b* and 252-*c* on the upper side of the liquid crystal panel 210 and the backlight lamps 252-*d*, 252-*e* and 252-*f* on the lower side of the liquid crystal panel 210 may be turned on simultaneously or sequentially.

It is also possible to arrange the backlight lamps 252-*a* to 252-*f* on one of the upper and lower sides of the liquid crystal panel 210, unlike FIG. 3(*b*). The number of backlight lamps arranged on each of the upper and lower sides of the liquid crystal panel 210 may be changed. Further, the backlight lamps 252-*a* to 252-*f* may be arranged in a row on each of the upper and lower sides of the liquid crystal panel 210.

Figure 4:
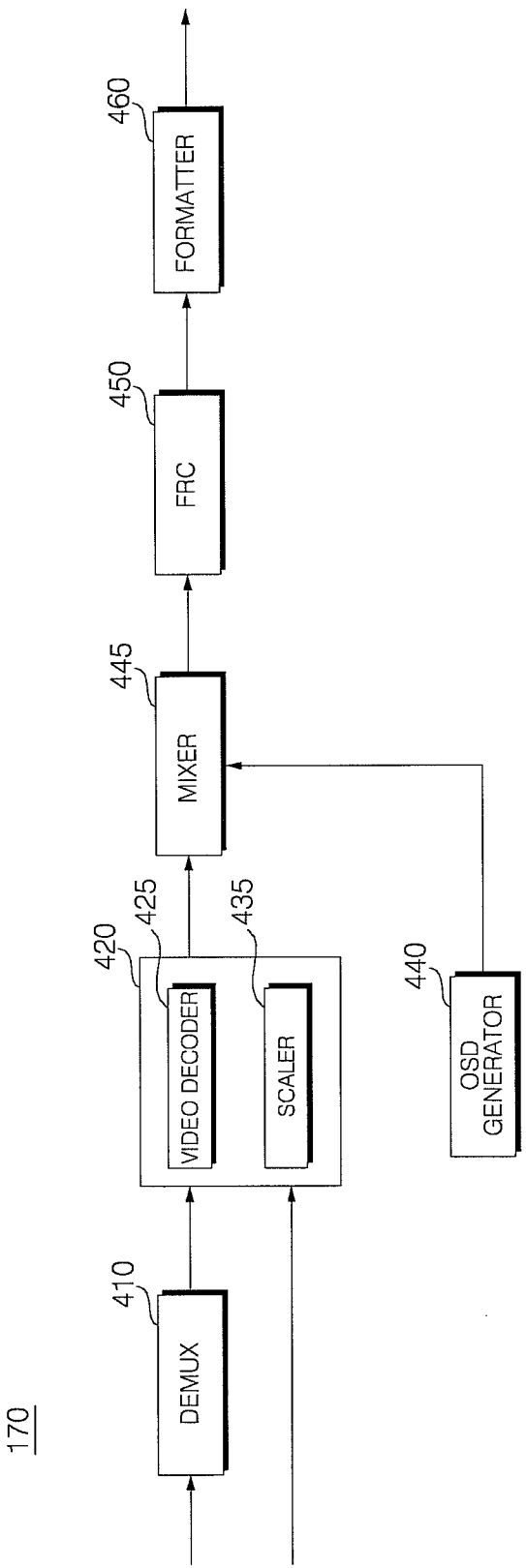
FIG. 4 shows a controller of the apparatus of FIG. 1.

FIG. 4 is a block diagram of the controller illustrated in FIG. 1, FIG. 5 illustrates 3D formats, and FIG. 6 illustrates operations of shutter glasses according to a frame sequential format illustrated in FIG. 5.

Referring to FIG. 4, the controller 170 may include a DEMUX 410, a video processor 420, an OSD generator 440, a mixer 445, a Frame Rate Converter (FRC) 450, and a formatter 460 according to one embodiment. The controller 170 may further include an audio processor (not shown) and a data processor (not shown).

The DEMUX 410 demultiplexes an input stream. For example, the DEMUX 410 may demultiplex an MPEG-2 TS into a video signal, an audio signal, and a data signal. The input stream signal may be received from the tuner 110, the demodulator 120 or the external device interface 130.

The video processor 420 may process the demultiplexed video signal. For the video signal processing, the video processor 420 may include a video decoder 425 and a scaler 435. The video decoder 425 decodes the demultiplexed video signal and the scaler 435 scales the resolution of the decoded video signal so that the video signal can be displayed on the display 180. Also, the video decoder 425 may be provided with decoders that operate based on various standards.

If the demultiplexed video signal is an MPEG-2 coded 2D video signal, the video signal may be decoded by an MPEG-2 decoder.

If the demultiplexed video signal is, for example, an H.264-encoded DMB or DVB-handheld (DVB-H) signal, the video signal may be decoded by an H.264 decoder. If the video signal is an MPEC-C part 3 depth video signal, a Multi-view Video Coding (MVC) video signal, or a Free-viewpoint TV (FTV) video signal, the video signal may be decoded by an MPEG-C decoder, an MVC decoder, or an FTV decoder.

The decoded video signal processed by the video processor 420 may be a 2D video signal, a 3D video signal, or a combination of both.

The video processor 420 may determine whether the demultiplexed video signal is a 2D or 3D video signal. For example, a broadcast signal received from the tuner 110, an external signal received from an external device, or an external signal received over a network may be a 3D video signal. The video processor 420 may determine whether an input stream is a 3D video signal, referring to a 3D flag set in the header of the stream, 3D metadata of the stream, or 3D format information about the stream.

The decoded video signal from the video processor 420 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

For 3D visualization, 3D formats illustrated in FIG. 5 are available. The 3D formats are a side-by-side format (FIG. 5(*a*)), a top/down format (FIG. 5(*b*)), a frame sequential format (FIG. 5(*c*)), an interlaced format (FIG. 5(*d*)), and a checker box format (FIG. 5(*e*)). A left-eye image L and a right-eye image R are arranged side by side in the side by side format. The left-eye image L and the right-eye image R are stacked vertically in the top/down format, while they are arranged in time division in the frame sequential format. In the interlaced format, the left-eye image L and the right-eye image R alternate line by line. The left-eye image L and the right-eye image R are mixed on a box basis in the checker box format.

The OSD generator 440 generates an OSD signal autonomously or according to a user input. For example, the OSD generator 440 may generate signals by which a variety of information is displayed as graphics or text on the display 180, according to user input signals or control signals. The OSD signal may include various data such as a User Interface (UI), a variety of menus, widgets, icons, etc. Also, the OSD signal may include a 2D object and/or a 3D object. Meanwhile, the OSD generator may be called as the graphic processor which generates the OSD signal or process graphic signal or text signal.

The mixer 445 may mix the decoded video signal processed by the video processor 420 with the OSD signal generated from the OSD generator 440. The OSD signal and the decoded video signal each may include at least one of a 2D signal or a 3D signal.

The FRC 450 may change the frame rate of the mixed video signal received from the mixer 445. For example, a frame rate of 60 Hz is converted into a frame rate of 120 or 240 Hz or 480 Hz. When the frame rate is changed from 60 Hz to 120 Hz, the same first frame is inserted between a first frame and a second frame, or a third frame predicted from the first and second frames is inserted between the first and second frames. If the frame rate is changed from 60 Hz to 240 Hz, three identical frames or three predicted frames are inserted between the first and second frames.

The formatter 460 may separate a 2D video signal and a 3D video signal from the mixed video signal of the OSD signal and the decoded video signal received from the mixer 445. Herein, a 3D video signal refers to a signal including a 3D object such as a Picture-In-Picture (PIP) image (still or moving), an EPG that describes broadcast programs, a menu, a widget, text, an object within an image, a person, a background, or a Web page (e.g. from a newspaper, a magazine, etc.).

The formatter 460 may change the format of the 3D video signal, for example, to one of the 3D formats illustrated in FIG. 5, the frame sequential format, herein. That is, the left-eye image signal L and the right-eye image signal R alternate with each other in time. Accordingly, the 3D viewing device 195 illustrated in FIG. 1 is preferably shutter glasses.

FIG. 6 illustrates an exemplary operation of the shutter glasses 195 in the frame sequential format illustrated in FIG. 5.

Referring to FIG. 6(*a*), when the left-eye image L is displayed on the display 180, the left lens is open and the right lens is shut off in the shutter glasses 195.

Referring to FIG. 6(*b*), when the right-eye image R is displayed on the display 180, the left lens is shut off and the Light lens is open in the shutter glasses 195.

Meanwhile, the formatter 460 may convert a 2D video signal to a 3D video signal. For example, the formatter 460 may detect edges or a selectable object from the 2D video signal and generate a 3D video signal with an object based on the detected edges or the selectable object. As described before, the 3D video signal may be separated into left-eye and right-eye image signals L and R.

The audio processor (not shown) of the controller 170 may process the demultiplexed audio signal. For the audio signal processing, the audio processor may have a plurality of decoders.

If the demultiplexed audio signal is a coded audio signal, the audio processor of the controller 170 may decode the audio signal. For example, if the demultiplexed audio signal is an MPEG-2 coded audio signal, it may be decoded by an MPEG-2 decoder. If the demultiplexed audio signal is an MPEG-4 Bit Sliced Arithmetic Coding (BSAC) coded audio signal for terrestrial DMB, it may be decoded by an MPEG-4 decoder. If the demultiplexed audio signal is an MPEG-2-Advanced Audio Coding (AAC) coded audio signal for satellite DMB or DVB-H, it may be decoded by an AAC decoder. If the demultiplexed audio signal is a Dolby AC-3 coded audio signal, it may be decoded by an AC-3 decoder.

The audio processor of the controller 170 may also adjust the bass, treble, and volume of the audio signal.

The data processor (not shown) of the controller 170 may process the data signal obtained by demultiplexing the input stream signal. For example, if the data signal is a coded signal such as an EPG which includes broadcast information specifying the start time, end time, etc. of scheduled broadcast TV or radio programs, the controller 170 may decode the data signal. Examples of an EPG include ATSC-Program and System Information Protocol (PSIP) information and DVB-Service Info nation (SI). ATSC-PSIP information or DVB-SI information may be included in the header of a TS, i.e., a 4-byte header of an MPEG-2 TS.

While it is shown in FIG. 4 that the mixer 445 mixes signals received from the OSD generator 440 and the video processor 420 and then the formatter 460 performs 3D processing on the mixed signal, the mixer 445 may be positioned after the formatter 460. Thus the formatter 460 may perform 3D processing on a signal received from the video processor 420, the OSD generator 440 may generate an OSD signal and subject the OSD signal to 3D processing, and then the mixer 445 may mix the processed 3D signals received from the formatter 460 and OSD generator 440.

The block diagram of the image display apparatus 100 illustrated in FIG. 4 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Especially, the FRC 450 and the formatter 460 may be configured separately outside the controller 170.

Figure 7:
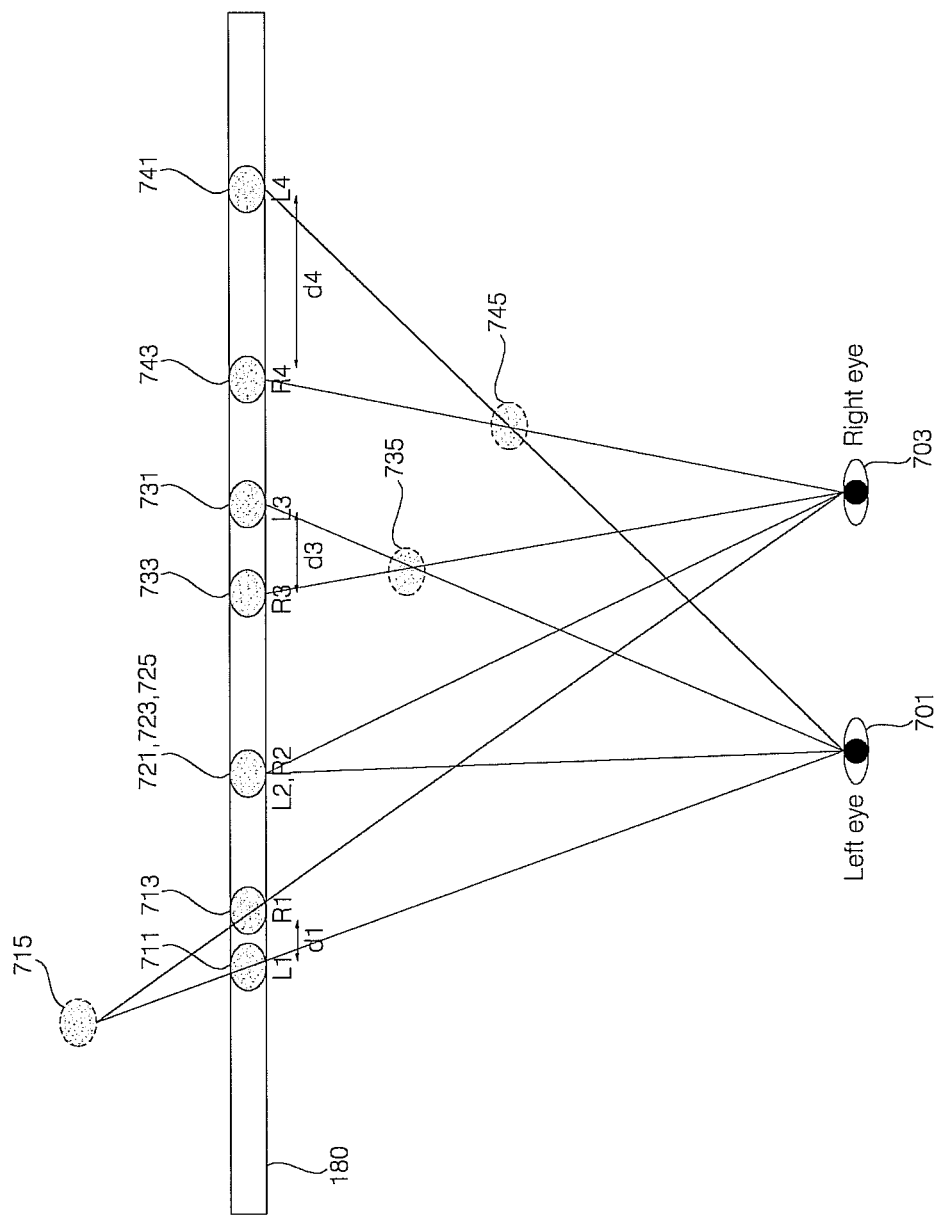
FIG. 7 shows how 3D images may be formed using left and right images.
Figure 8:
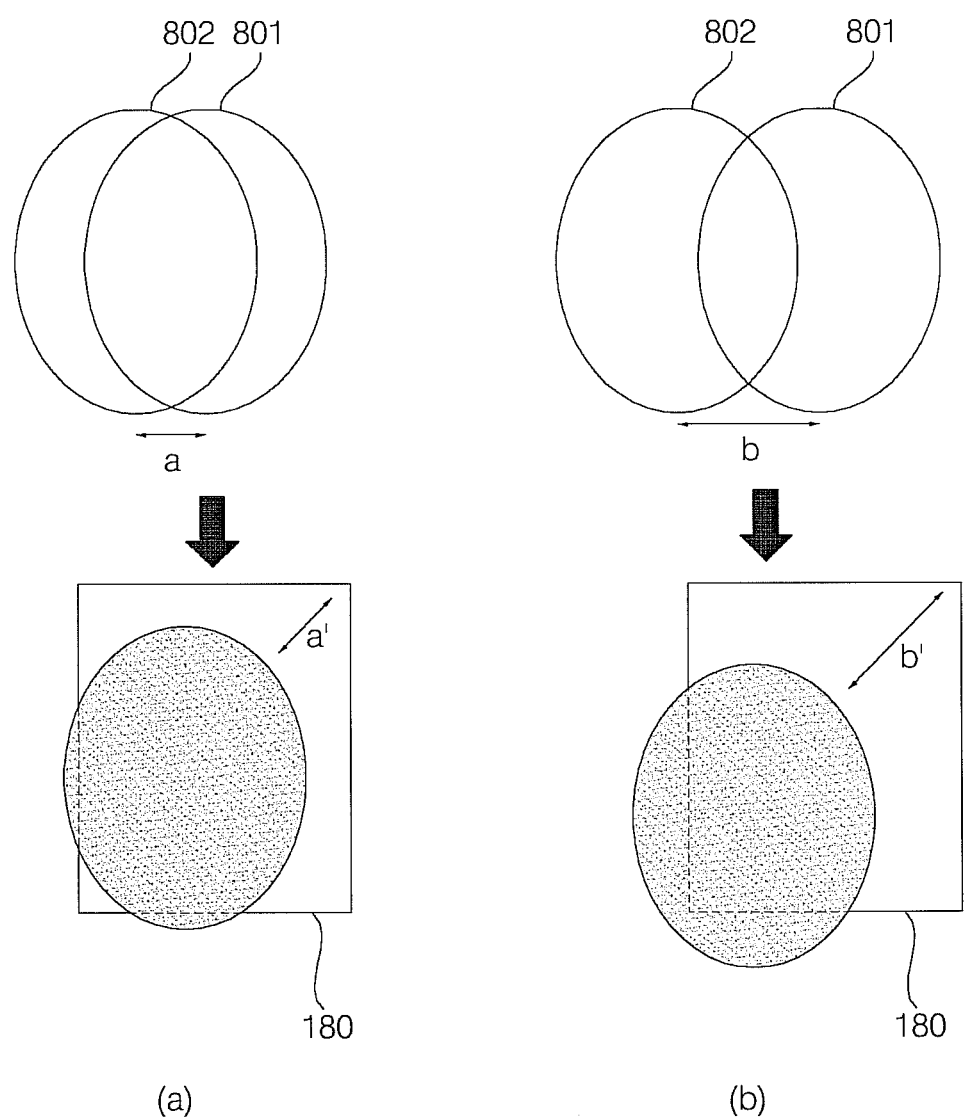
FIG. 8 shows different depth perceptions produced by different disparities between a left image and right images.

FIG. 7 illustrates formation of 3D images by combining left-eye and right-eye images, and FIG. 8 illustrates different depth illusions according to different disparities between a left-eye image and a right-eye image.

Referring to FIG. 7, there are a plurality of images or objects 715, 725, 735 and 745. A first object 715 is created by combining a first left-eye image 711 (L1) based on a first left-eye image signal with a first right-eye image 713 (R1) based on a first right-eye image signal, with a disparity dl between the first left-eye and right-eye images 711 and 713. The user sees an image as formed at the intersection between a line connecting a left eye 701 to the first left-eye image 711 and a line connecting a right eye 703 to the first right-eye image 713. Therefore, the user is tricked into perceiving the first object 715 as behind the display 180.

As a second object 725 is created by overlapping a second left-eye image 721 (L2) with a second right-eye image 723 (R2) on the display 180, thus with a disparity of 0 between the second left-eye and right-eye images 721 and 723. Thus, the user perceives the second object 725 as on the display 180.

A third object 735 is created by combining a third left-eye image 731 (L3) with a third right-eye image 733 (R3), with a disparity d3 between the third left-eye and right-eye images 731 and 733. A fourth object 745 is created by combining a fourth left-eye image 741 (L4) with a fourth right-eye image 743 (R4), with a disparity d4 between the fourth left-eye and right-eye images 741 and 743.

The user perceives the third and fourth objects 735 and 745 at image-faulted positions, that is, as being positioned before the display 180.

Because the disparity d4 between the fourth left-eye and right-eye images 741 and 743 is larger than the disparity d3 between the third left-eye and right-eye images 731 and 733, the fourth object 745 appears more protruding than the third object 735.

In one embodiment, the distances between the display 180 and the objects 715, 725, 735 and 745 are represented as depths. When an object is perceived to the user as being positioned behind the display 180, the depth of the object is negative-signed. On the other hand, when an object is perceived to the user as being positioned before the display 180, the depth of the object is positive-signed. Therefore, as an object appears more protruding to the user, it is deeper, that is, its depth is larger.

Referring to FIG. 8, the disparity a between a left-eye image 801 and a right-eye image 802 in FIG. 8(*a*) is smaller than the disparity b between the left-eye image 801 and the right-eye image 802 in FIG. 8(*b*). Consequently, the depth a' of a 3D object created in FIG. 8(*a*) is smaller than the depth b' of a 3D object created in FIG. 8(*b*).

In the case where a left-eye image and a right-eye image are combined to a 3D image, if the left-eye and right-eye images of 3D images are apart from each other by different disparities, the 3D images are perceived to the user as formed at different positions. This means that the depth of a 3D image or 3D object formed with a left-eye image and a right-eye image in combination may be controlled by adjusting the disparity of the left-eye and right-eye images.

Figure 9:
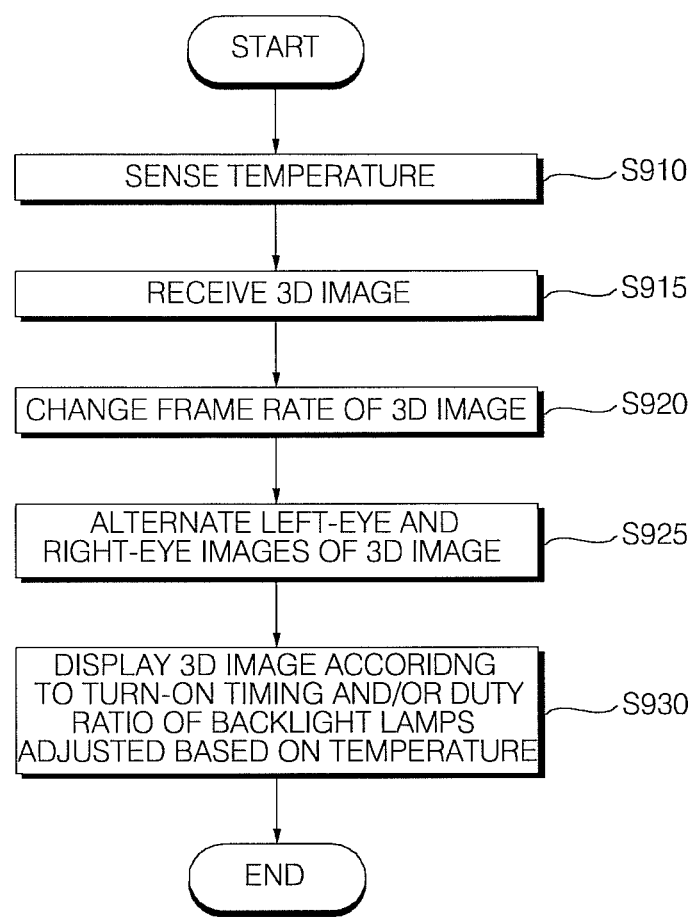
FIG. 9 shows steps included in one embodiment of a method for operating an image display apparatus.
Figure 10:
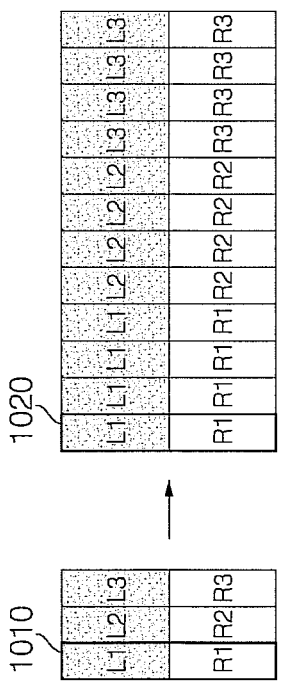
FIGS. 10 to 27 show examples of various waveforms, backlight operation, and/or other signals associated with the method for operating an image display apparatus.

FIG. 9 shows one embodiment of a method for operating an image display apparatus, and FIGS. 10 to 27 show various examples of waveforms, backlight operation, and other features including crosstalk compensation relating to this method.

Referring to FIG. 9, temperature is sensed (S910). As stated before, the temperature sensor 270 senses the ambient temperature of the display 180, particularly the liquid crystal panel 210. Information about the sensed temperature may be provided to the backlight unit 250.

A 3D image is then received (S915). The image display apparatus 100, particularly the controller 170 receives the 3D image. For example, the 3D image may be a broadcast image based on a broadcast signal received from the tuner 110, an external image received from an external device, an image stored in the memory 140, or an image received from a content provider over a network.

If a stream containing an image has information, a flag or metadata indicating whether the image is a 3D image, the controller 170 may acquire the information, flag or metadata by demultiplexing or decoding the stream and determine whether the received image is a 3D image based on the acquired information, flag or metadata.

If the received image is a multi-viewpoint image, the controller 170 may determine whether the image includes left-eye and right-eye images to thereby determine whether the image is a 3D image.

If the received 3D image is a coded one, the controller 170 demultiplexes or decodes the 3D image through the DEMUX 410 or the video processor 420.

FIG. 10(a) illustrates video frames of 3D images processed by the video processor 420. It is noted from FIG. 10(a) that a 3D video frame 1010 is configured in the top/down format illustrated in FIG. 5(b).

Then the frame rate of the 3D image is changed (S915) and the left-eye and right-eye images of the frame rate-changed 3D image are arranged alternately (S920). The frame rate conversion may be optional.

The FRC 450 of the controller 170 may change the frame rate of a decoded 3D image. For example, the FRC 450 changes 60-Hz to 120 Hz or 240 Hz or 480 Hz.

FIG. 10(b) illustrates an exemplary increase of the frame rate of a 3D image in the FRC 450. The FRC 450 may increase the frame rate of the 3D image by repeating a 3D video frame 1020. The top/down format of the 3D image may still be maintained.

While the frame rate is shown in FIG. 10(b) as increased four times, various settings are possible, such as doubling the frame rate.

The formatter 460 arranges the left-eye and right-eye images of the 3D image alternately, that is, in the frame sequential format illustrated in FIG. 5(c) (S925).

FIGS. 10(c) and 10(d) illustrate exemplary conversion of the format of the frame rate-changed 3D video frame into the frame sequential format in the formatter 460.

Referring to FIG. 10(c), a first left-eye video frame L1 1030, the first left-eye video frame L1, a first right-eye video frame R1, the first right-eye video frame R1, and a second left-eye video frame L2 are sequentially arranged. That is, identical left-eye video frames are successively arranged, followed by successive identical right-eye video frames.

Referring to FIG. 10(d), the first left-eye video frame L1 1030, a black frame 1040, the first right-eye video frame R1, a black frame, and the second left-eye video frame L2 are sequentially arranged. That is, a black frame is inserted between left-eye and right-eye video frames. After the formatter 460 alternately arranges left-eye video frames and right-eye video frames, these frames are provided to the display 180.

Subsequently, the display 180 displays the 3D image (S930). Especially, at least one of the turn-on timing or turn-on duty of the backlight lamps 252 of the display 180 may be adjusted according to the temperature sensed in step S910. For example, if the sensed temperature is room temperature (about 27° C.), the backlight lamps 252 may be driven at a first turn-on timing or with a first turn-on duty. Herein, it is assumed that the backlight lamps 252 are driven in Pulse Width Modulation (PWM).

If the sensed temperature exceeds the room temperature (about 27° C.), for example, if the sensed temperature is about 45° C., the backlight lamps 252 are driven at a second turn-on timing advanced from the first turn-on timing or with a second turn-on duty larger than the first turn-on duty.

On the other hand, if the sensed temperature is below the room temperature (about 27° C.), for example, if the sensed temperature is about 5° C., the backlight lamps 252 are driven at a third turn-on timing delayed from the first turn-on timing or with a third turn-on duty smaller than the first turn-on duty.

In summary, as temperature decreases, the turn-on timing of the backlight lamps 252 may be delayed. Or as temperature increases, the turn-on duty of the backlight lamps 252 may increase. The temperature-based driving of the backlight lamps will be described later with reference to FIGS. 14 to 27.

Figure 11:
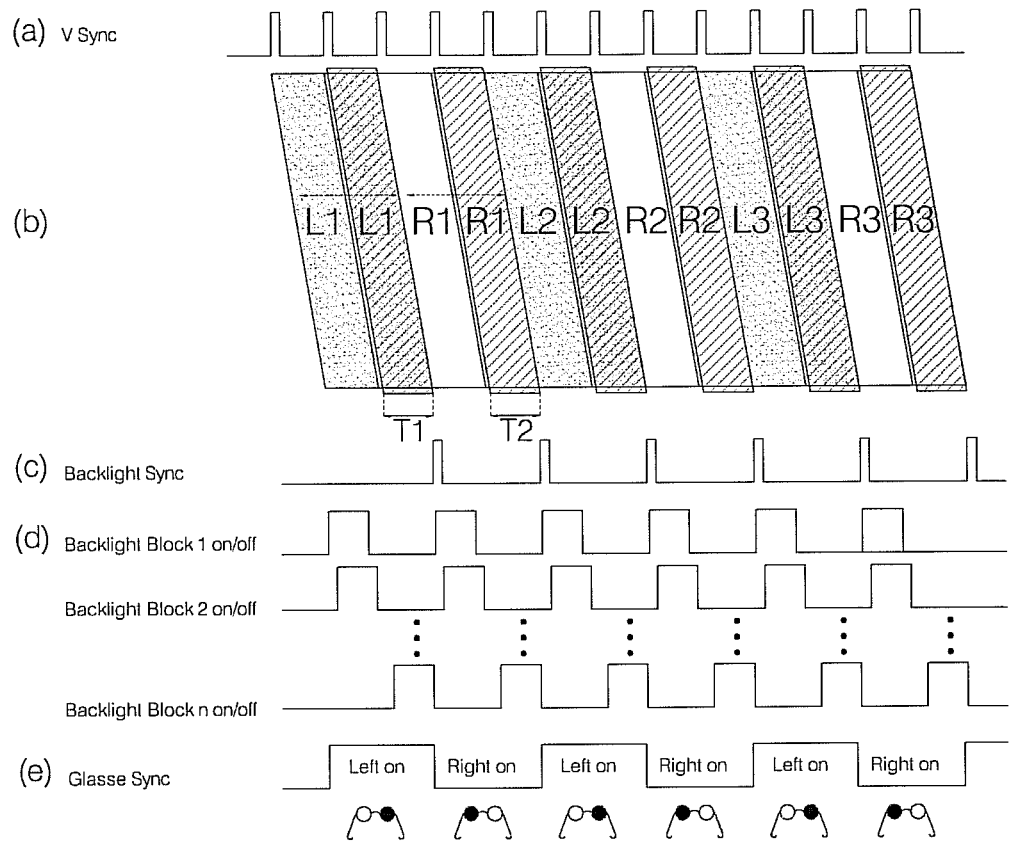
Figure 12:
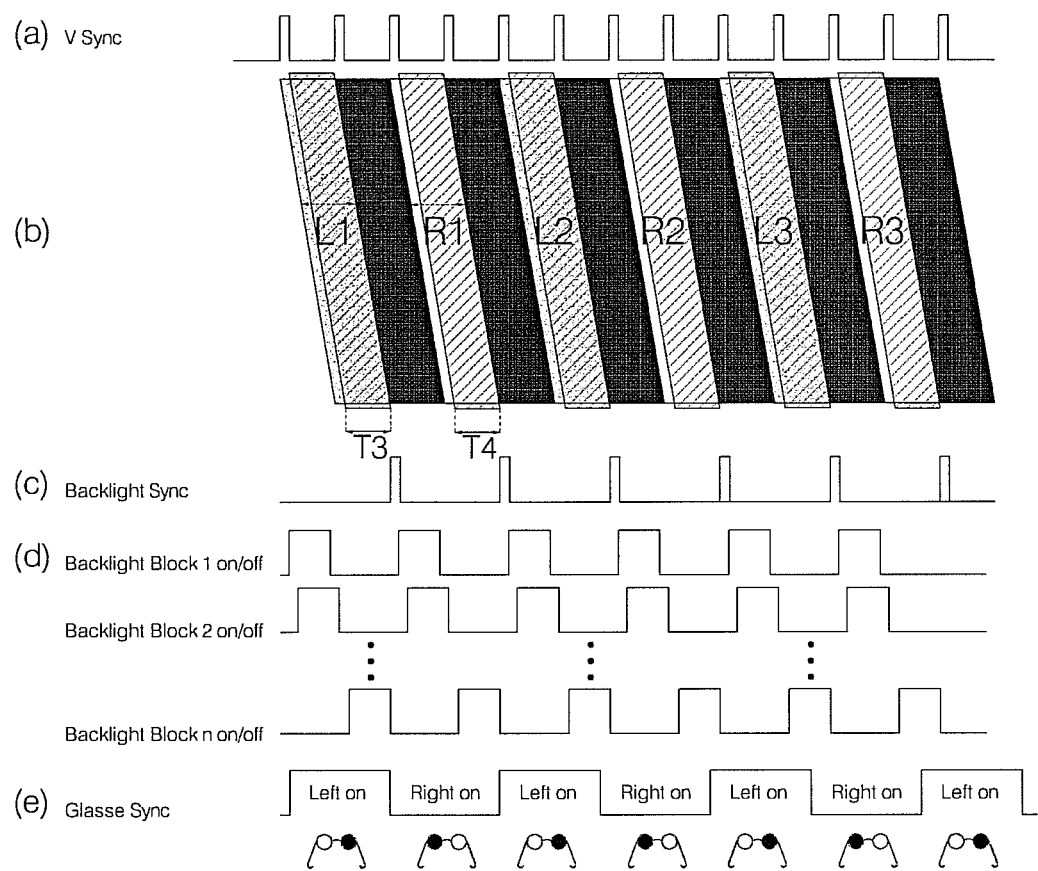
Figure 13:
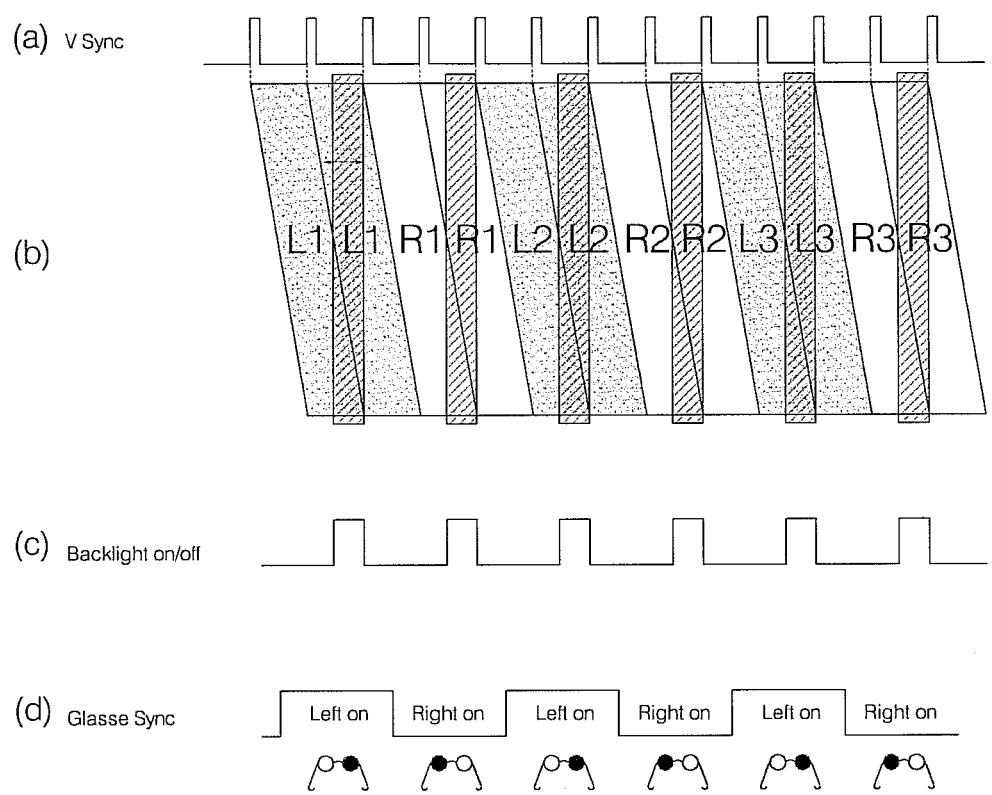

FIGS. 11, 12 and 13 illustrate exemplary backlight driving for 3D imaging.

Referring to FIG. 11, with left-eye and right-eye video frames arranged in the format illustrated in FIG. 10(c) by the formatter 460, the backlight lamps 252 are turned on in synchronization with left-eye and right-eye video frames. Specifically, the plurality of backlight lamps 252-1 to 252-n are sequentially turned on a block basis in synchronization with the left-eye video frames and are then sequentially turned on a block basis in synchronization with the right-eye video frames.

The frame layout of FIG. 11(b) is characterized by repetition of identical frames like the frame layout of FIG. 10(c). In FIG. 11(b), video frames are arranged in the order of the first left-eye video frame L1, the first left-eye video frame L1, the first right-eye video frame R1, the first right-eye video frame R1, and the second left-eye video frame L2. Therefore, a first turn-on period T1 of the backlight lamps 252 may be set to various values within the total length of two left-eye video frames L1 and L1, L2 and L2, or L3 and L3, and a second turn-on period T2 of the backlight lamps 252 may be set to various values within the total length of two right-eye video frames R1 and R1, R2 and R2, or R3 and R3.

FIG. 11(c) is a diagram illustrating a backlight synchronization timing and FIG. 11(d) is a diagram illustrating a turn on/off timing of the backlight lamps 252. Preferably, the backlight lamps 252-1 to 252-n are of a direct type characterized by arrangement of backlight lamps in a row and are turned on sequentially on a block basis. The individual turn-on periods of the backlight lamps 252-1 to 252-n may be set to various values within the total length of the repeated left-eye video frames L1 and L1, L2 and L2, or L3 and L3 or within the total length of the repeated right-eye video frames R1 and R1, R2 and R2, or R3 and R3.

FIG. 11(e) is a diagram illustrating an operation signal timing of the shutter glasses 195. Only the left lens of the shutter glasses 195 is open when the left-eye video frames L1, L2 and L3 are displayed, and only the right lens of the shutter glasses 195 is open when the right-eye video frames R1, R2 and R3 are displayed.

Referring to FIG. 12, with left-eye and right-eye video frames alternating with each other with black frames interposed between them in the format illustrated in FIG. 10(d) by the formatter 460, the backlight lamps 252 are turned on in synchronization with the left-eye and right-eye video frames. Specifically, the plurality of backlight lamps 252-1 to 252-n are sequentially turned on a block basis in synchronization with the left-eye video frames and are then sequentially turned on a block basis in synchronization with the right-eye video frames.

The frame layout of FIG. 12(b) is characterized by arrangement of a first left-eye video frame L1, a black frame, a first right-eye video frame R1, a black frame, and a second left-eye video frame in this order like the frame layout of FIG. 10(d). Accordingly, a first turn-on period T3 of the backlight lamps 252 may cover the length of the left-eye video frame L1, L2 or L3 and a part of a black frame and a second turn-on period T4 of the backlight lamps 252 may cover the length of the right-eye video frame R1, R2 or R3 and a part of a black frame.

FIG. 12(c) is a diagram illustrating a backlight synchronization timing and FIG. 12(d) is a diagram illustrating a turn on/off timing of the backlight lamps 252. Preferably, the backlight lamps 252-1 to 252-n are turned on sequentially on a block basis.

FIG. 12(e) is a diagram illustrating an operation signal timing of the shutter glasses 195. Only the left lens of the shutter glasses 195 is open when the left-eye video frames L1, L2 and L3 are displayed, and only the right lens of the shutter glasses 195 is open when the right-eye video frames R1, R2 and R3 are displayed.

Referring to FIG. 13, the backlight lamps 252 are turned on in synchronization with left-eye and right-eye video frames that are arranged alternately with each other in the format illustrated in FIG. 10(c) by the formatter 460.

FIG. 13(a) illustrates a vertical synchronization signal V Sync indicating the display timing of each frame.

FIG. 13(b) illustrates an example of turning on the backlight lamps 252 in synchronization with the left-eye and right-eye video frames, while each frame is input to the liquid crystal panel 210. Referring to FIG. 13(b), the backlight lamps 252 are turned on during a part of the total length of successive left-eye video frames on the upper side of the liquid crystal panel 210 and are turned on during a part of the total length of successive right-eye video frames on the lower side of the liquid crystal panel 210. Herein, the backlight lamps 252 are turned on simultaneously on the upper and lower sides of the liquid crystal panel 210, by way of example.

FIG. 13(c) is a diagram illustrating a backlight synchronization timing. Referring to FIG. 13(c), the backlight lamps 252 are turned on at a high level. The backlight lamps 252 described in FIG. 13 are arranged on the upper and lower sides of the liquid crystal panel 210, that is, in an edge type. As stated above, the backlight lamps 252 on the upper side of the liquid crystal panel 210 are turned on simultaneously with the backlight lamps 252 on the lower part of the liquid crystal panel 210.

FIG. 13(d) is a diagram illustrating an operation signal timing of the shutter glasses 195. According to the operation signal timing of the shutter glasses 195, only the left lens of the shutter glasses 195 is open when the left-eye video frames L1, L2 and L3 are displayed, and only the right lens of the shutter glasses 195 is open when the right-eye video frames R1, R2 and R3 are displayed.

Figure 14:
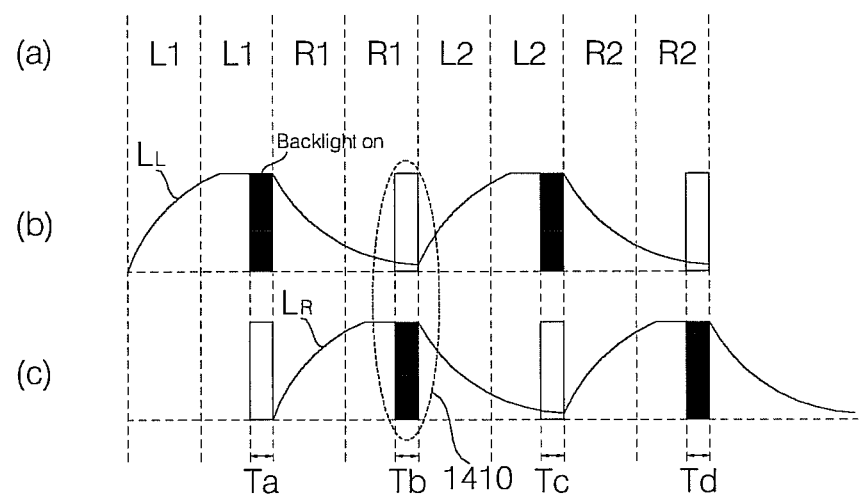
Figure 15:
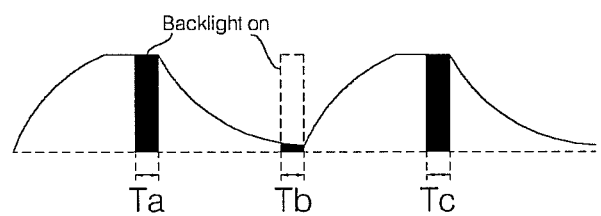

FIGS. 14 and 15 illustrate an exemplary crosstalk phenomenon during 3D imaging. Referring to FIG. 14(a), identical first left-eye video frames L1 and L1, identical first right-eye video frames R1 and R1, identical second left-eye video frames L2 and L2, and then identical second right-eye video frames R2 and R2 are sequentially arranged as illustrated in FIG. 10(c). The liquid crystal panel 210 may be driven in the order of frame arrangement.

FIGS. 14(b) and 14(c) illustrate actual liquid crystal response curves LL and LR. The horizontal axis represents time and the vertical axis represents voltage or open/closed ratio.

Referring to FIG. 14(b), the liquid crystal response curve LL repeats a pattern of rise, hold and fall according to input left-eye image data. Referring to FIG. 14(c), the liquid crystal response curve LR also repeats the pattern of rise, hold and fall according to input left-eye image data, in such a manner that peaks and valleys of the liquid crystal response curve LR alternate with peaks and valleys of the liquid crystal response curve LL.

The backlight lamps 252 may be turned on during a peak period Ta or Tc of the liquid crystal response curve LL so as to display left-eye images, and the backlight lamps 252 may be turned on during a peak period Tb or Td of the liquid crystal response curve LR so as to display right-eye images.

As the liquid crystal response curve LL falls slowly, it may overlap with a rising part of the liquid crystal response curve LR over a period 1410. Thus, a left-eye image and a right-eye image may be displayed partially simultaneously during the overlap period 1410 (about Tb long), thereby resulting in crosstalk.

FIG. 15 illustrates the liquid crystal response curve LL based on left-eye image data, with the crosstalk period.

To reduce the crosstalk, the turn-on timing or turn-on duty of the backlight lamps 252 may be changed, taking into account the liquid crystal response curve LL or LR. Specifically, at least one of the turn-on timing or turn-on duty of the backlight lamps is adjusted, taking into account a liquid crystal response curve varying with temperature.

Figure 16:
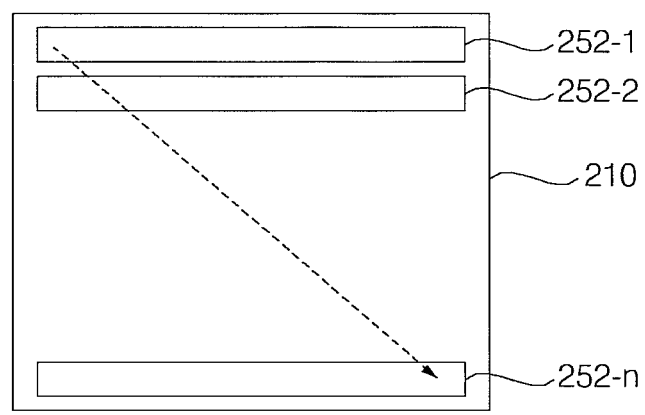

FIG. 16 illustrates a direct-type layout of the backlight lamps 252-1 to 252-n on the rear surface of the liquid crystal panel 210. The following description is given of FIGS. 17 to 22 with the appreciation that the liquid crystal panel 210 is scanned sequentially from top to bottom, in the arrowed direction of FIG. 16. In addition, the liquid crystal response curve related to left-eye images, illustrated in FIG. 14, will be focused on, herein.

Figure 17:
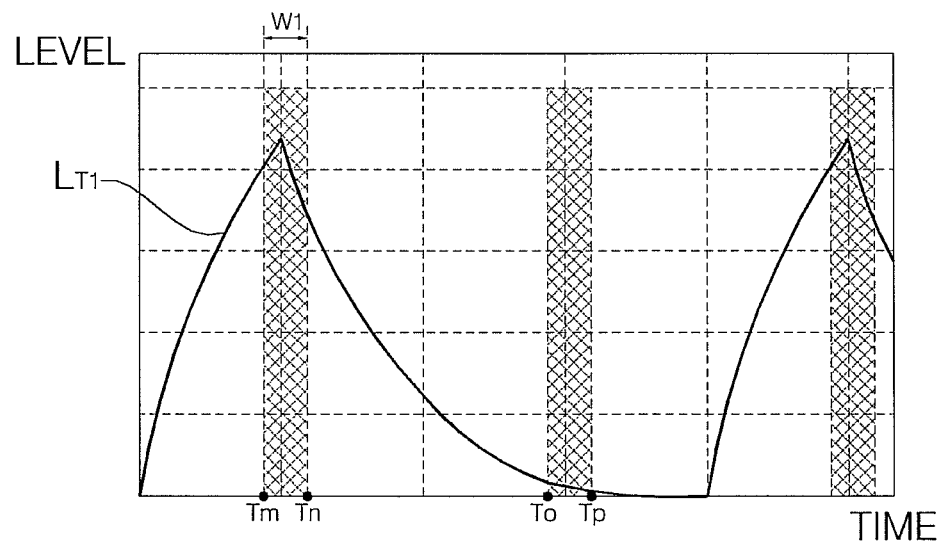

FIG. 17 illustrates a liquid crystal response curve LT1 at a first temperature and the resulting turn-on timing of the backlight lamps. The first temperature may be room temperature (about 27° C.). Referring to FIG. 17, if the liquid crystal response curve LT1 repeatedly rises and falls according to left-eye image data, the backlight lamps 252 may turn on in the vicinity of peaks of the liquid crystal response curve LT1. The backlight lamps 252 are turned on during a time period from Tm to Tn according to left-eye image data and during a time period from To to Tp according to right-eye image data in FIG. 17. The turn-on duty ratio of the backlight lamps 252 may be set to W1.

Figure 18:
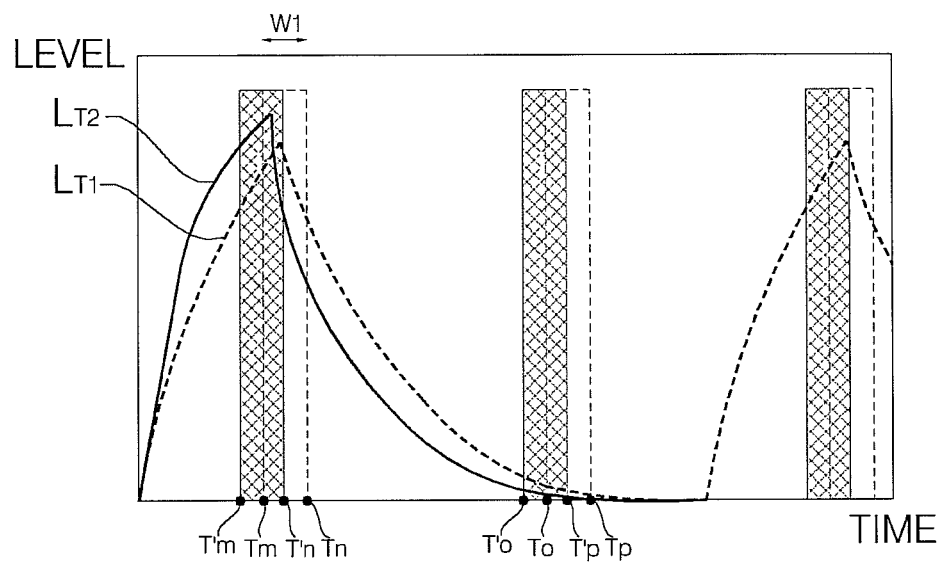

FIG. 18 illustrates a liquid crystal response curve LT2 at a second temperature and the resulting turn-on timing of the backlight lamps. The second temperature is higher than the first temperature, for example about 45° C.

Referring to FIG. 18, the liquid crystal response curve LT2 may be different from the liquid crystal response curve LT1. Since the second temperature is higher than the first temperature, the liquid crystal response curve LT2 may have a greater liquid crystal response speed than the liquid crystal response curve LT1. For example, the rising time or falling time of the liquid crystal response curve LT2 may be earlier than that of the liquid crystal response curve LT1.

Therefore, it is preferred to advance the turn-on timing of the backlight lamps 252 in correspondence with the liquid crystal response curve LT2 showing a faster response. That is, the backlight lamps 252 may be turned on in the vicinity of peaks of the liquid crystal response curve LT2.

In FIG. 18, the backlight lamps 252 are turned on during a time period from time T'm earlier than time Tm to time T'n earlier than time Tn according to left-eye image data, and during a time period from time T'o earlier than time To to time T'p earlier than time Tp according to right-eye image data. The same turn-on duty ratio W1 may be set for the backlight lamps 252.

A comparison between the turn-on timings of the backlight lamps 252 illustrated in FIGS. 17 and 18 reveals that when the liquid crystal response curve LT1 falls, it has a shorter crosstalk period.

Since the turn-on timing of the backlight lamps is controlled according to a temperature-incurred change in the liquid crystal response curve in this manner, crosstalk is reduced during displaying left-eye and right-eye images.

The backlight lamps 252 are turned on in the vicinity of the peaks of the liquid crystal response curve LT2 at the changed turn-on timing based on the change of the liquid crystal response curve. Hence, more light may be projected onto the liquid crystal panel 210 from the backlight lamps 252, thereby increasing contrast.

Figure 19:
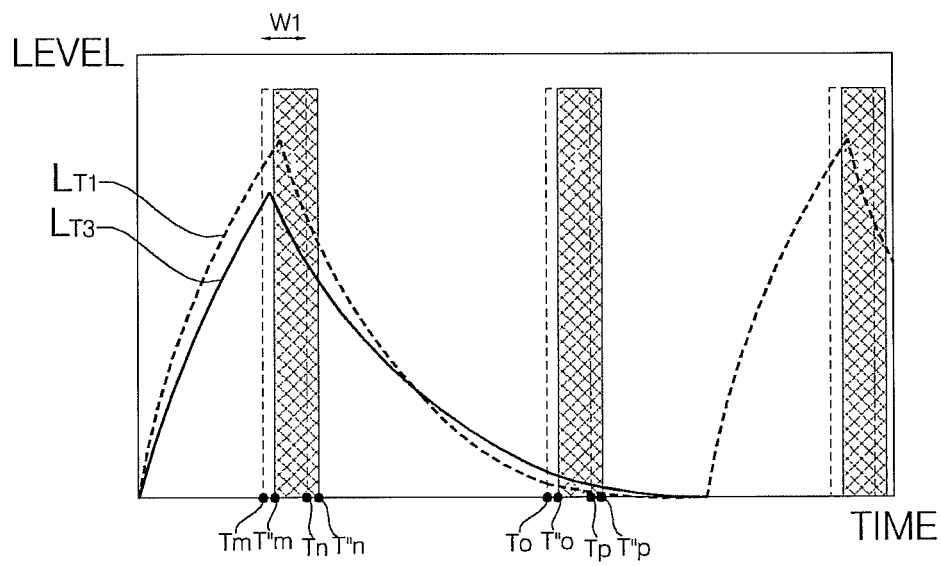

FIG. 19 illustrates a liquid crystal response curve LT3 at a third temperature and the resulting turn-on timing of the backlight lamps. The third temperature is lower than the first temperature, for example about 5° C.

Referring to FIG. 19, the liquid crystal response curve LT3 may be different from the liquid crystal response curve LT1. Since the third temperature is lower than the first temperature, the liquid crystal response curve LT3 may have a smaller liquid crystal response speed than the liquid crystal response curve LT1. For example, the rising time or falling time of the liquid crystal response curve LT3 may be later than that of the liquid crystal response curve LT1.

Therefore, it is preferred to delay the turn-on timing of the backlight lamps 252 in correspondence with the liquid crystal response curve LT3 showing a slower response. That is, the turn-on timing of the backlight lamps 252 is preferably delayed to minimize crosstalk.

In FIG. 19, the backlight lamps 252 are turned on during a time period from time T"m later than time Tm to time T"n later than time Tn according to left-eye image data, and during a time period from time T"o later than time To to time T"p later than time Tp according to right-eye image data. The same turn-on duty ratio W1 may be set for the backlight lamps 252.

A comparison between the turn-on timings of the backlight lamps illustrated in FIGS. 17 and 19 reveals that crosstalk occurs over a shorter period when the liquid crystal response curve LT3 falls.

As the turn-on timing of the backlight lamps is controlled according to a temperature-incurred change in the liquid crystal response curve in this manner, crosstalk is reduced during displaying left-eye and right-eye images.

Figure 20:
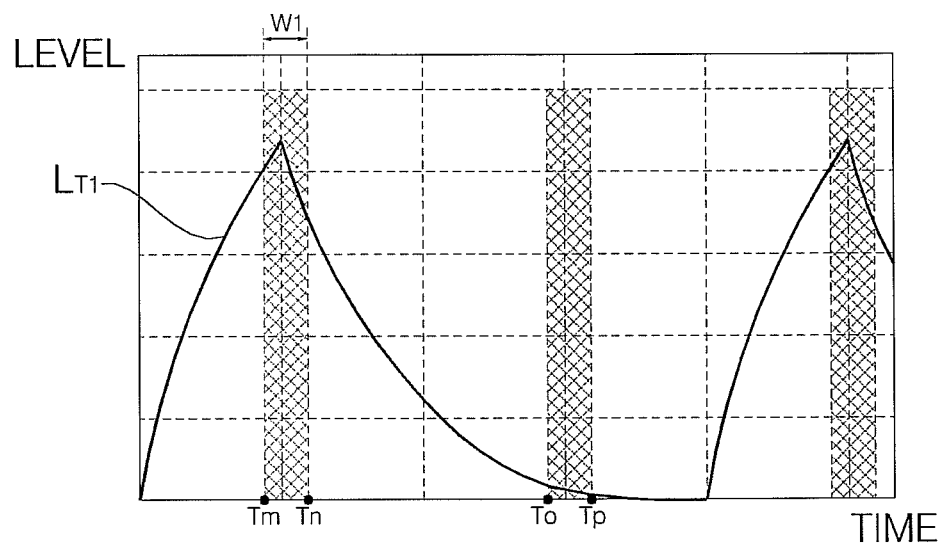
Figure 21:
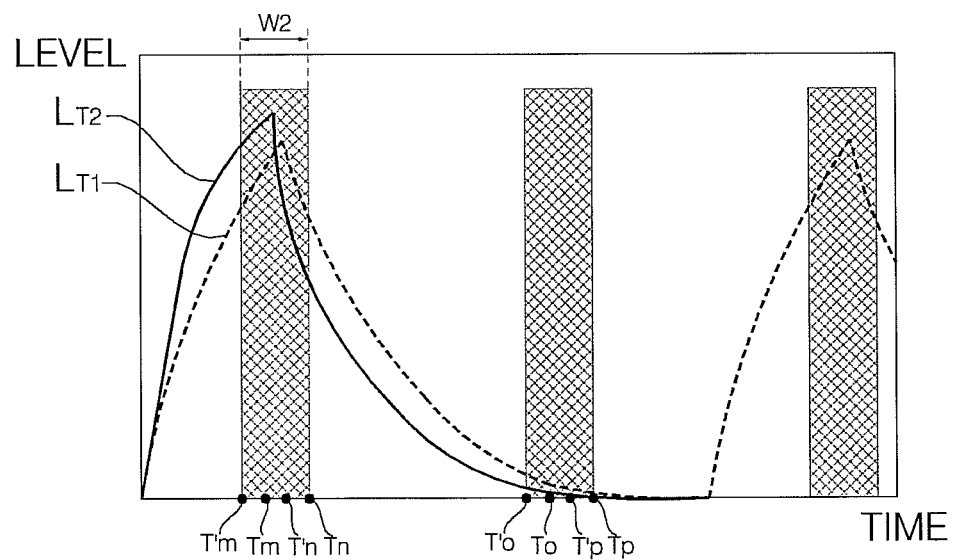
Figure 22:
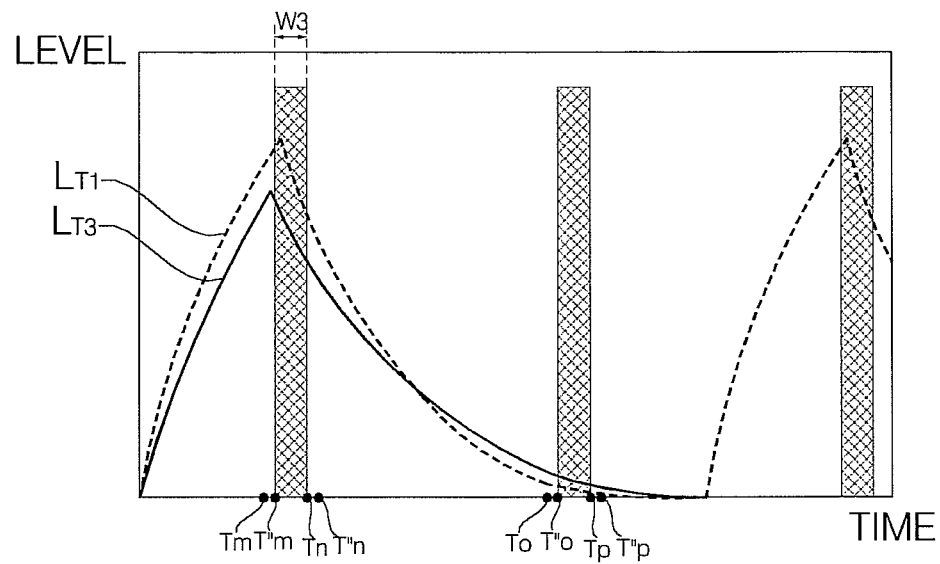

FIGS. 20, 21 and 22 are views referred to for describing adjustment of the turn-on duty ratio of the backlight lamps.

FIG. 20 illustrates the same liquid crystal response curve LT1 as illustrated in FIG. 17. Thus a description of FIG. 20 will not be provided herein to avoid redundancy. The turn-on duty ratio of the backlight lamps 252 may be set to W1.

FIG. 21 illustrates the liquid crystal response curve LT2 at the second temperature and the resulting turn-on timing of the backlight lamps. The second temperature is higher than the first temperature, for example about 45° C.

Referring to FIG. 21, the liquid crystal response curve LT2 may be different from the liquid crystal response curve LT1. The turn-on duty ratio of the backlight lamps 252 is increased in correspondence with the liquid crystal response curve LT2 having a greater liquid crystal response speed than the liquid crystal response curve LT1 in FIG. 21.

The backlight lamps 252 are turned on during a time period from time T'm earlier than time Tm to time Tn according to left-eye image data, and during a time period from time T'o earlier than time To to time Tp according to right-eye image data. The turn-on duty ratio of the backlight lamps 252 may be increased from W1 to W2, compared to FIG. 20.

The turn-on duty ratio W2 increases the amount of light transmitted from the backlight lamps 252 to the liquid crystal panel 210, thereby increasing contrast.

FIG. 22 illustrates the liquid crystal response curve LT3 at the third temperature and the resulting turn-on timing of the backlight lamps. The third temperature is lower than the first temperature, for example about 5° C.

Referring to FIG. 22, the liquid crystal response curve LT3 is different from the liquid crystal response curve LT1. The turn-on duty ratio of the backlight lamps 252 is decreased in correspondence with the liquid crystal response curve LT3 having a smaller liquid crystal response speed than the liquid crystal response curve LT1 in FIG. 22.

The backlight lamps 252 are turned on during a time period from time T"m later than time Tm to time Tn according to left-eye image data, and during a time period from time T"o later than time To to time Tp according to right-eye image data. The turn-on duty ratio of the backlight lamps 252 may be decreased from W1 to W3, compared to FIG. 20.

The turn-on duty ratio W3 shortens a crosstalk period in a falling part of the liquid crystal response curve LT3.

In this manner, control of the turn-on duty ratio of the backlight lamps according to a temperature-incurred change in the liquid crystal response curve leads to a decreased crosstalk during displaying left-eye and right-eye images.

In accordance with one embodiment, the backlight lamps may be overdriven, in addition to changing the turn-on timing or turn-on duty ratio of the backlight lamps according to temperature. Overdriving refers to adding gray level data to original gray level data. The overdriving may increase the response speed (rising or falling speed) of the liquid crystal panel.

In another embodiment, overdriving may not be performed, when the turn-on timing or turn-on duty ratio of the backlight lamps is adjusted according to temperature.

Figure 23:
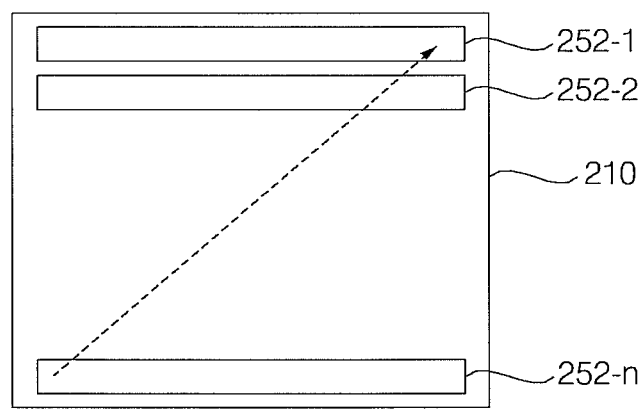

FIG. 23 illustrates a direct-type layout of the backlight lamps 252-1 to 252-n on the rear surface of the liquid crystal panel 210. The following description is given of FIGS. 24 and 25 with the appreciation that the liquid crystal panel 210 is scanned sequentially from bottom to top, in the arrowed direction of FIG. 23. In addition, the liquid crystal response curve related to left-eye images, illustrated in FIG. 14, will be focused on, herein.

Figure 24:
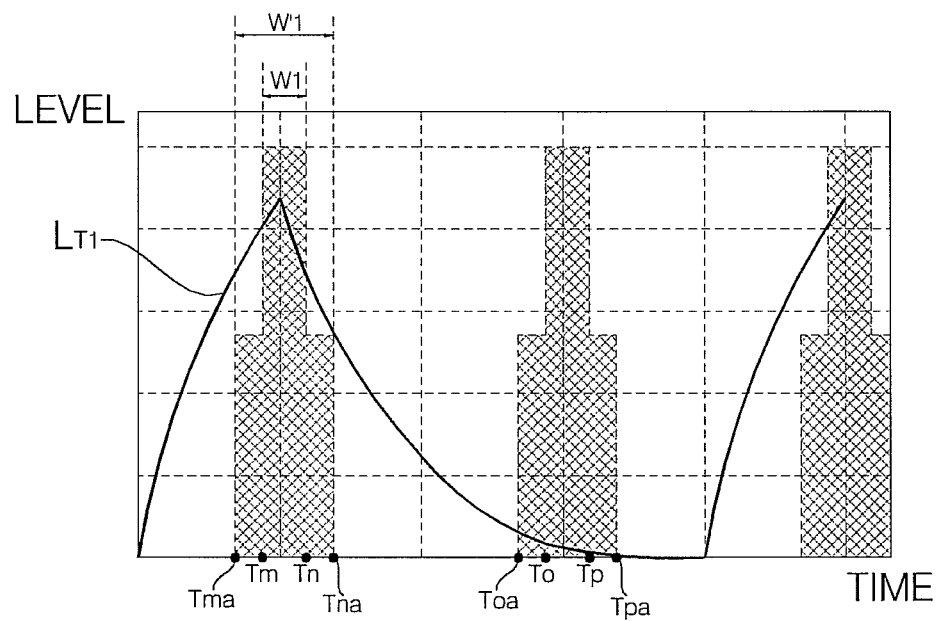

FIG. 24 illustrates the liquid crystal response curve LT1 at the first temperature and the resulting turn-on timing of the backlight lamps. The first temperature may be room temperature (about 27° C.).

Compared to FIG. 17, the liquid crystal response curve LT1 and the turn-on timing of the backlight lamps 252 are the same, except that because the backlight scanning of the panel is directed from bottom to top, interference occurs between light emitted from a current turned-on backlight lamp and light emitted during the previous or following scanning and thus the light emitted from the turned-on backlight lamp is shaped into an upside-down T.

Accordingly, the backlight lamps 252 are turned on during a time period from Tma earlier than time Tm to Tna later than Tn according to left-eye image data and during a time period from To a earlier than time To to time Tpa later than time Tp according to right-eye image data in FIG. 25. The turn-on duty ratios of the backlight lamps 252 on the upper and lower sides of the liquid crystal panel 210 may be W1 as illustrated in FIG. 17 and W"1, respectively. W"1 may be three times larger than W1.

Figure 25:
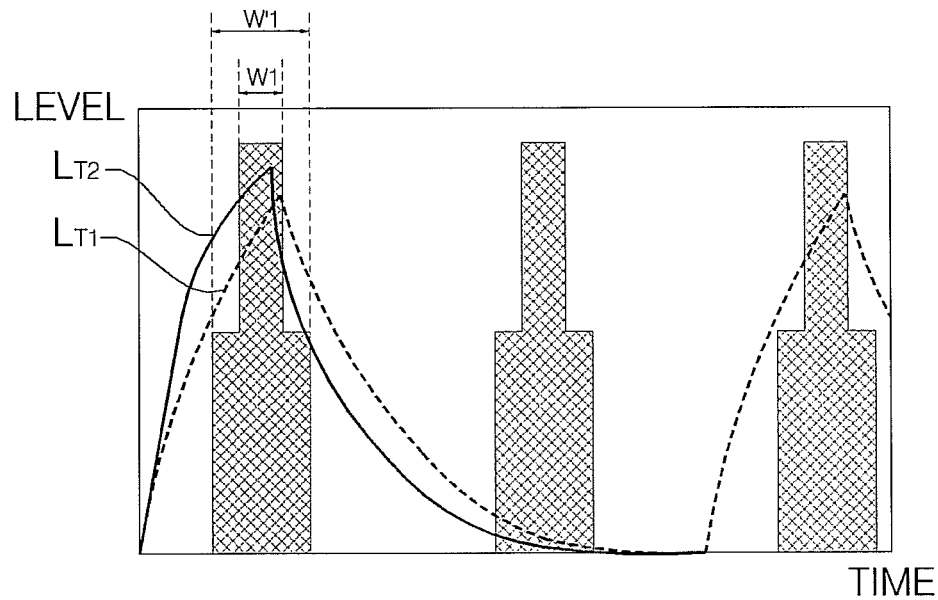

FIG. 25 illustrates the liquid crystal response curve LT2 at the second temperature and the resulting turn-on timing of the backlight lamps, like FIG. 18. Compared to FIG. 24, the turn-on timing of the backlight lamps 252 is set to be earlier in FIG. 25. As a consequence, crosstalk can be reduced and contrast can be increased.

Figure 26:
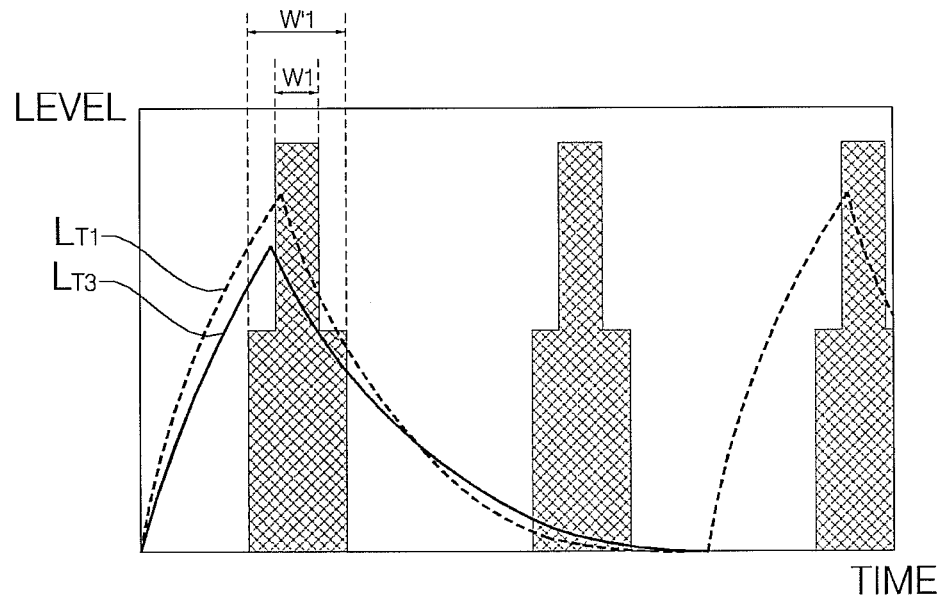

FIG. 26 illustrates the liquid crystal response curve LT3 at the third temperature and the resulting turn-on timing of the backlight lamps, like FIG. 19. Compared to FIG. 24, the turn-on timing of the backlight lamps 252 is delayed. As a consequence, crosstalk can be reduced.

In the embodiments illustrated in FIGS. 24, 25 and 26, the turn-on duty ratio of the backlight lamps may be changed according to temperature in the manners of FIGS. 20, 21 and 22, rather than the turn-on timing of the backlight lamps is changed.

While at least one of the turn-on timing or turn-on duty of the backlight lamps 252 is automatically changed according to temperature sensed by the temperature sensor 270 in the above description, the adjustment of the at least one of the turn-on timing or turn-on duty of the backlight lamps 252 may be performed manually.

Figure 27:
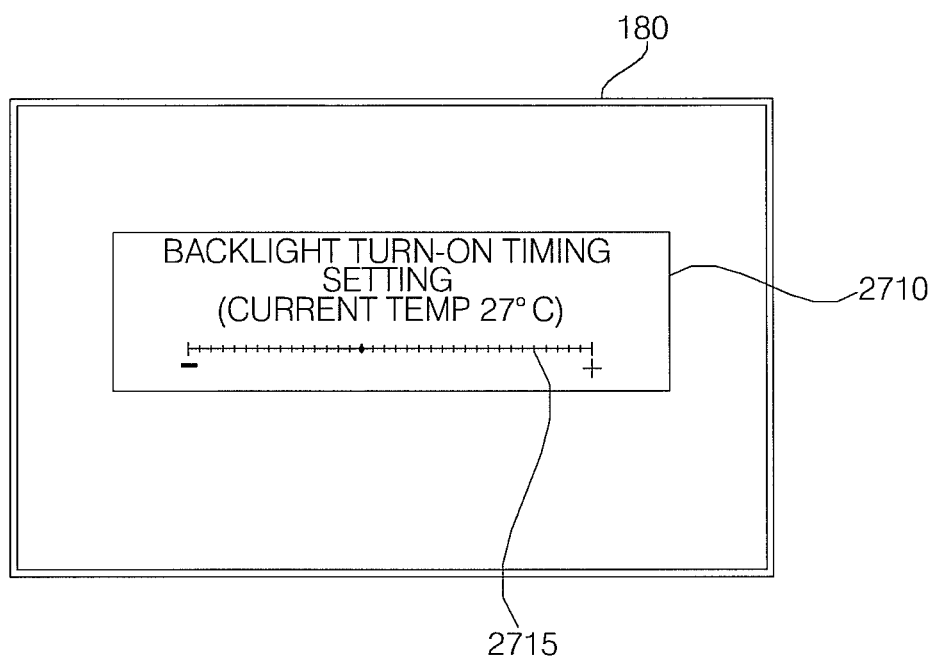

FIG. 27 illustrates exemplary display of a setup menu 2710 for setting the turn-on timing of backlight lamps on the display 180. For example, upon entering a setup screen, the setup menu 270 for setting the turn-on timing of backlight lamps may be displayed on the display 180.

The setup menu 270 may include an object 2715 that enables a user to advance or delay the turn-on timing of the backlight lamps through input of a + key or a − key. To help with setting the turn-on timing of the backlight lamps, a current sensed temperature may be further displayed on the display 180, as illustrated in FIG. 27. Therefore, the turn-on timing of backlight lamps can be set simply.

The turn-on timing or turn-on duty ratio of the backlight lamps may also be adjusted according to sensed temperature, when a black frame is interposed between left-eye and right-eye images as illustrated in FIG. 10(d).

Even though the frame rate of an image is not changed, the turn-on timing or turn-on duty of the backlight lamps may also be adjusted according to sensed temperature.

The method for adjusting the turn-on timing or turn-on duty ratio of backlight lamps may be extended to 2D visualization as well as 3D visualization. Specifically, the ambient temperature of the image display apparatus is sensed. Then when an input image is displayed, at least one of the turn-on timing or turn-on duty of the backlight lamps may be changed. Thus the contrast of the image can be improved.

As is apparent from the above description, when the left-eye and right-eye images of a 3D image are arranged alternately, at least one of the turn-on timing or turn-on duty of backlight lamps of a display is adjusted according to the temperature or ambient temperature of the display. Therefore, crosstalk can be reduced and contrast can be improved.

Further, if an image display apparatus adopts a hold-type liquid crystal panel, crosstalk can be reduced by increasing the frame rate of a 3D image and alternating the left-eye and right-eye images of the 3D image with each other.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

As discussed, one or more embodiments described herein provide an image display apparatus and a method for operating the same, which can decrease crosstalk. According to one approach, crosstalk is decreased according to the liquid crystal response curve of a liquid crystal panel that varies with temperature.

In accordance with another embodiment, a method is provided for operating an image display apparatus having a plurality of backlight lamps, where the method includes receiving a 3D image, alternately arranging left-eye and right-eye images of the 3D image, and displaying the alternately arranged left-eye and right-eye images on a display by turning on the backlight lamps in synchronization with the alternately arranged left-eye and right-eye images. To display the 3D image, a turn-on timing of the backlight lamps is adjusted according to temperature of the display or ambient temperature of the display.

In accordance with another embodiment, a method is provided for operating an image display apparatus having a plurality of backlight lamps, including sensing temperature of the image display apparatus, receiving an image, and displaying the image. When the image is displayed, at least one of a turn-on timing or turn-on duty of the backlight lamps is adjusted according to the sensed temperature.

In accordance with another embodiment, an image display apparatus is provided having a plurality of backlight lamps, a formatter to alternately arrange left-eye and right-eye images of a received 3D image, a display having a display panel with a plurality of backlight lamps arranged on a rear surface thereof, and a temperature sensor to sense temperature or ambient temperature of the display panel. The display displays the alternately arranged left-eye and right-eye images by turning on the backlight lamps in synchronization with the alternately arranged left-eye and right-eye images according to a turn-on timing or a turn-on duty of the backlight lamps adjusted according to the temperature or ambient temperature of the display panel.

In accordance with another embodiment, a method for controlling a display apparatus comprises receiving a three-dimensional (3D) video signal that includes left image data and right image data; generating a predetermined arrangement of the left and right image data; detecting a temperature of the display device; and controlling operation of one or more backlight lamps of the display device based on the predetermined arrangement of left and right image data and the detected temperature.

The controlling step may include turning on the one or more backlight lamps at predetermined times, wherein each predetermined time corresponds to a time when a left or right image of one frame does not overlap a left or right image of a succeeding or preceding frame.

The generating step may include repeating left and right images throughout a time period, wherein the backlight lamps are turned on in said time period. The left images may be repeated in succession and the right images may be repeated in succession in said time period.

The generating step may include alternately arranging left and right images; and inserting a black image between the left and right images, wherein the one or more backlight lamps are turned on during display of each of the left and right images and are turned off during display of the black image.

The generating step may include repeating left and right images throughout a time period, wherein the one or more backlight lamps are turned on for a first duration which overlaps at least two left images and for a second duration that overlaps at least two right images in said time period, and wherein the first and second durations are separated by a predetermined amount of time.

The first duration may only partially overlap each of at least two left images and the second duration may only partially overlap each of at least two right image of each frame in said time period.

The first duration may overlap a first part of a first one of the left images and overlap a second part of a second succeeding one of the left images, the first part and the second part substantially forming an entire one of the left images, and the second duration may overlap a first part of a first one of the right images and may overlap a second part of a second succeeding one of the right images, the first part and the second part of the right images substantially forming an entire one of the right images.

In addition, the method may include controlling left and right sides of a pair of shutter glasses in synchronism with the predetermined arrangement of the left and right images of the plurality of frames.

In addition, a duration of a turn-on time of the one or more backlight lamps may be controlled based on the detected temperature. And, the one or more backlight lamps may be adjusted to achieve a predetermined contrast based on the detected temperature. The detected temperature may be an ambient temperature in a vicinity of the display apparatus, or the detected temperature may be a temperature of the display apparatus.

In addition, the method may include displaying a setup menu for setting a turn-on timing of the one or more backlight lamps.

In accordance with another embodiment, a controller comprises a formatter to generate a predetermined arrangement of left and right image data in a three-dimensional (3D) video signal; and a processor to control operation of one or more backlight lamps of a display device based on the predetermined arrangement of left and right image data and a detected temperature.

The processor may turn on the one or more backlight lamps at predetermined times, wherein each predetermined time corresponds to a time when a left or right image of one frame does not overlap a left or right image of a succeeding or preceding frame. The formatter may repeat the left and right images of each frame throughout a time period, and wherein said processor turns on the one or more backlight lamps in said time period. The left images of each frame may be repeated in succession and the right images of each frame may be repeated in succession in said time period.

The formatter may alternately arrange left and right images and may insert a black image between the left and right images. The processor may turn on the one or more backlight lamps during display of each of the left and right images and turns off the backlight lamps during display of the black image.

The formatter may repeat the left and right image data throughout a time period, and the processor may turn on the one or more backlight lamps for a first duration which overlaps at least two left images and turns on the one or more backlight lamps for a second duration that overlaps at least two right images in said time period, wherein the first and second durations are separated by a predetermined amount of time.

The first duration may only partially overlap each of at least two left images and the second duration may only partially overlap each of at least two right images of each frame in said time period.

The first duration may overlap a first part of a first one of the left images and may overlap a second part of a second succeeding one of the left images, the first part and the second part substantially forming an entire one of the left images, and the second duration may overlap a first part of a first one of the right images and may overlap a second part of a second succeeding one of the right images, the first part and the second part of the right images substantially forming an entire one of the right images.

The processor may control left and right sides of a pair of shutter glasses in synchronism with the predetermined arrangement of the left and right image data.

In accordance with another embodiment, a display device is provided to include a controller according to one or more of the aforementioned embodiments.

The terms "module" and "unit" used to signify components are herein to help the understanding of the components and thus they should not be considered as having specific meanings or roles. Accordingly, the terms "module" and "unit" may be used interchangeably.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments. The features of one embodiment may be combined with the features of one or more of the other embodiments described herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a display apparatus, comprising:
   receiving a three-dimensional (3D) video signal that includes left image data and right image data;
   alternately arranging the left and right image data;
   detecting a temperature of the display apparatus; and
   displaying the alternately arranged left-eye and right-eye data on a display by turning on one or more backlight lamps in synchronization with the alternately arranged left-eye and right-eye data, and
   wherein the displaying comprises adjusting a turn-on timing and a turn-on duty ratio of the backlight lamps according to the detected temperature,
   wherein, as the temperature or ambient temperature of the display decreases, the turn-on timing of the backlight lamps is delayed, and
   wherein, as the detected temperature increases, the turn-on duty ratio of the backlight lamps is increased.

2. The method of claim 1, wherein said generating includes:
   repeating left and right images throughout a time period, wherein the backlight lamps are turned on in said time period.

3. The method of claim 2, wherein the left images are repeated in succession and the right images are repeated in succession in said time period.

4. The method of claim 1, wherein said arranging includes:
inserting a black image between the left and right images,
wherein the one or more backlight lamps are turned on during display of each of the left and right images and are turned off during display of the black image.

5. The method of claim 1, wherein said arranging includes:
repeating left and right images throughout a time period,
wherein the one or more backlight lamps are turned on for a first duration which overlaps at least two left images and for a second duration that overlaps at least two right images in said time period, and wherein the first and second durations are separated by a predetermined amount of time.

6. The method of claim 5, wherein the first duration only partially overlaps each of the at least two left images and the second duration only partially overlaps each of the at least two right images of each frame in said time period.

7. The method of claim 6, wherein:
the first duration overlaps a first part of a first one of the left images and overlaps a second part of a second succeeding one of the left images, the first part and the second part substantially forming an entire one of the left images, and
the second duration overlaps a first part of a first one of the right images and overlaps a second part of a second succeeding one of the right images, the first part and the second part of the right images substantially forming an entire one of the right images.

8. The method of claim 1, further comprising:
controlling left and right sides of a pair of shutter glasses in synchronism with the predetermined arrangement of left and right images.

9. The method of claim 1, wherein the detected temperature is an ambient temperature in a vicinity of the display apparatus.

10. The method of claim 1, wherein the detected temperature is a temperature of the display apparatus.

11. The method of claim 1, further comprising:
displaying a setup menu for setting a turn-on timing of the one or more backlight lamps.

12. A display apparatus comprising:
a formatter to alternately arrange left and right image data in a three-dimensional (3D) video signal;
a temperature sensor to detect temperature of a display apparatus;
a display having a display panel with one or more backlight lamps arranged on a rear surface thereof and to display the alternately arranged left-eye and right-eye image data by turning on the one or more backlight lamps in synchronization with the alternately arranged left-eye and right-eye data; and
a processor to control operation of one or more backlight lamps of the display apparatus based on the predetermined arrangement of left and right image data and the detected temperature,
wherein the processor adjusts a turn-on timing and a turn-on duty ratio of the backlight lamps according to the detected temperature,
wherein, as the temperature or ambient temperature of the display decreases, the turn-on timing of the backlight lamps is delayed, and
wherein, as the detected temperature increases, the turn-on duty ratio of the backlight lamps is increased.

13. The display apparatus of claim 12, wherein said formatter repeats left and right images throughout a time period, and wherein said processor turns on the one or more backlight lamps in said time period.

14. The display apparatus of claim 13, wherein the left images are repeated in succession and the right images are repeated in succession in said time period.

15. The display apparatus of claim 12, wherein said formatter inserts a black image between the left and right images, and wherein said processor turns on the one or more backlight lamps during display of the left and right images and turns off the backlight lamps during display of the black image.

16. The display apparatus of claim 12, wherein:
said formatter repeats left and right images throughout a time period, and
said processor turns on the one or more backlight lamps for a first duration which overlaps at least two left images and turns on the one or more backlight lamps for a second duration that overlaps at least two right images in said time period, wherein the first and second durations are separated by a predetermined amount of time.

17. The display apparatus of claim 12, wherein the first duration only partially overlaps each of at least two left images and the second duration only partially overlaps each of at least two right images in said time period.

18. The display apparatus of claim 17, wherein:
the first duration overlaps a first part of a first one of the left images and overlaps a second part of a second succeeding one of the left images, the first part and the second part substantially forming an entire one of the left images, and
the second duration overlaps a first part of a first one of the right images and overlaps a second part of a second succeeding one of the right images, the first part and the second part of the right images substantially forming an entire one of the right images.

19. The display apparatus of claim 12, wherein said processor:
controls left and right sides of a pair of shutter glasses in synchronism with the predetermined arrangement of the left and right image data.

\* \* \* \* \*